United States Patent
Cui et al.

(10) Patent No.: US 10,474,363 B1
(45) Date of Patent: Nov. 12, 2019

(54) SPACE REPORTING IN A STORAGE SYSTEM

(71) Applicant: Pure Storage, Inc., Mountain View, CA (US)

(72) Inventors: Wentian Cui, Sunnyvale, CA (US); Matthew Fay, Mountain View, CA (US); Marina Galata, San Jose, CA (US); Richard Hankins, San Jose, CA (US); Ganesh Ramanarayanan, Menlo Park, CA (US); Cary Sandvig, Palo Alto, CA (US); Zoheb Shivani, Sunnyvale, CA (US); Scott Smith, San Mateo, CA (US); Shishir Yadav, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 108 days.

(21) Appl. No.: 15/339,215

(22) Filed: Oct. 31, 2016

Related U.S. Application Data

(60) Provisional application No. 62/368,776, filed on Jul. 29, 2016.

(51) Int. Cl.
  *G06F 3/06* (2006.01)
(52) U.S. Cl.
  CPC ............ *G06F 3/0608* (2013.01); *G06F 3/067* (2013.01); *G06F 3/0653* (2013.01)
(58) Field of Classification Search
  CPC ....... G06F 3/0608; G06F 3/067; G06F 3/0653
  (Continued)

(56) References Cited

U.S. PATENT DOCUMENTS

| | | |
|---|---|---|
| 5,706,210 A | 1/1998 | Kumano et al. |
| 5,799,200 A | 8/1998 | Brant et al. |

(Continued)

FOREIGN PATENT DOCUMENTS

| | | |
|---|---|---|
| EP | 0725324 A2 | 8/1996 |
| WO | WO 2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Hua J Song

(57) ABSTRACT

Space reporting in a storage system, including: determining, for one or more system-visible objects in the storage system, an amount of physical space consumed by each system-visible object and an amount of logical space consumed by each system-visible object; identifying, for each of the one or more system-visible objects in the storage system, one or more user-visible objects that reference the system-visible object; determining, for each of the one or more user-visible objects, an amount of physical space consumed by the user-visible object in dependence upon the amount of physical space consumed by each system-visible object referenced by the user-visible object; and determining, for each of the one or more user-visible objects, an amount of logical space consumed by the user-visible object in dependence upon the amount of logical space consumed by each system-visible object referenced by the user-visible object.

17 Claims, 10 Drawing Sheets

(58) Field of Classification Search
USPC .......................................................... 711/171
See application file for complete search history.

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,507,532 B1 | 11/2016 | Colgrove et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Vana Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0156956 A1* | 6/2014 | Ezra .................. G06F 3/065 711/162 |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |

(56) References Cited

U.S. PATENT DOCUMENTS

| | | |
|---|---|---|
| 2016/0352720 A1 | 12/2016 | Hu et al. |
| 2016/0352830 A1 | 12/2016 | Borowiec et al. |
| 2016/0352834 A1 | 12/2016 | Borowiec et al. |

FOREIGN PATENT DOCUMENTS

| | | |
|---|---|---|
| WO | WO2013071087 A1 | 5/2013 |
| WO | WO 2014/110137 A1 | 7/2014 |
| WO | WO 2016/015008 A1 | 12/2016 |
| WO | WO 2016/190938 A1 | 12/2016 |
| WO | WO 2016/195759 A1 | 12/2016 |
| WO | WO 2016/195958 A1 | 12/2016 |
| WO | WO 2016/195961 A1 | 12/2016 |

OTHER PUBLICATIONS

PCMag. "Storage Array Definition". Published May 10, 2013. <http://web.archive.org/web/20130510121646/http://www.pcmag.com/encyclopedia/term/52091/storage-array>, 2 pages.
Google Search of "storage array define" performed by the Examiner on Nov. 4, 2015 for U.S. Appl. No. 14/725,278, Results limited to entries dated before 2012, 1 page.
Techopedia. "What is a disk array". Published Jan. 13, 2012. <http://web.archive.org/web/20120113053358/http://www.techopedia.com/definition/1009/disk-array>, 1 page.
Webopedia. "What is a disk array". Published May 26, 2011. <http://web/archive.org/web/20110526081214/http://www.webopedia.com/TERM/D/disk_array.html>, 2 pages.
Li et al., *Access Control for the Services Oriented Architecture*, Proceedings of the 2007 ACM Workshop on Secure Web Services (SWS '07), Nov. 2007, pp. 9-17, ACM New York, NY.
The International Search Report and the Written Opinion received from the International Searching Authority (ISA/EPO) for International Application No. PCT/US2016/015006, dated Apr. 29, 2016, 12 pages.
The International Search Report and the Written Opinion received from the International Searching Authority (ISA/EPO) for International Application No. PCT/US2016/015008, dated May 4, 2016, 12 pages.
C. Hota et al., *Capability-based Cryptographic Data Access Control in Cloud Computing*, Int. J. Advanced Networking and Applications, col. 1, Issue 1, dated Aug. 2011, 10 pages.
The International Search Report and the Written Opinion received from the International Searching Authority (ISA/EPO) for International Application No. PCT/US2016/020410, dated Jul. 8, 2016, 17 pages.
The International Search Report and the Written Opinion received from the International Searching Authority (ISA/EPO) for International Application No. PCT/US2016/032084, dated Jul. 18, 2016, 12 pages.
Faith, "dictzip file format", GitHub.com (online). [Accessed Jul. 28, 2015], 1 page, URL: https://github.com/fidlej/idzip.
Wikipedia, "Convergent Encryption", Wikipedia.org (online), accessed Sep. 8, 2015, 2 pages, URL: en.wikipedia.org/wiki/Convergent_encryption.
Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.
The International Search Report and the Written Opinion received from the International Searching Authority (ISA/EPO) for International Application No. PCT/US2016/016333, dated Jun. 8, 2016, 12 pages.
ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinoin received from the International Searching Authority (ISA/EPO) for International Application No. PCT/US2016/032052, dated Aug. 30, 2016, 17 pages.
Microsoft, "Hybrid for SharePoint Server 2013—Security Reference Architecture", <http://hybrid.office.com/img/Security_Reference_Architecture.pdf> (online), dated Oct. 2014, 53 pages.
Microsoft, "Hybrid Identity", <http://aka.ms/HybridIdentityWp> (online), dated Apr. 2014, 36 pages.
Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.
Jacob Bellamy-McIntyre et al., "OpenID and the Enterprise: A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.
The International Search Report and the Written Opinion received from the International Searching Authority (ISA/EPO) for International Application No. PCT/US2016/035492, dated Aug. 17, 2016, 10 pages.
The International Search Report and the Written Opinion received from the International Searching Authority (ISA/EPO) for International Application No. PCT/US2016/036693, dated Aug. 29, 2016, 10 pages.
The International Search Report and the Written Opinion received from the International Searching Authority (ISA/EP) for International Application No. PCT/US2016/038758, dated Oct. 7, 2016, 10 pages.
The International Search Report and the Written Opinion received from the International Searching Authority (ISA/EP) for International Application No. PCT/US2016/040393, dated Sep. 22, 2016, 10 pages.
The International Search Report and the Written Opinion received from the International Searching Authority (ISA/EP) for International Application No. PCT/US2016/044020, dated Sep. 30, 2016, 11 pages.
Kwok Kong, *Using PCI Express as the Primary System Interconnect in Multiroot Compute, Storage, Communications and Embedded Systems*, IDT, White Paper, <http://www.idt.com/document/whp/idt-pcie-multi-root-white-paper>, retrieved by WIPO Dec. 4, 2014, dated Aug. 28, 2008, 12 pages.
The International Search Report and the Written Opinion received from the International Searching Authority (ISA/EP) for International Application No. PCT/US2016/044874, dated Oct. 7, 2016, 11 pages.
The International Search Report and the Written Opinion received from the International Searching Authority (ISA/EP) for International Application No. PCT/US2016/044875, dated Oct. 5, 2016, 13 pages.
The International Search Report and the Written Opinion received from the International Searching Authority (ISA/EP) for International Application No. PCT/US2016/044876, dated Oct. 21, 2016, 12 pages.
The International Search Report and the Written Opinion received from the International Searching Authority (ISA/EP) for International Application No. PCT/US2016/044877, dated Sep. 29, 2016, 13 pages.
Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0-7695-4430-4, DOI: 10.1109/MASCOTS.2011.50, dated Jul. 25-27, 2011, 11 pages.

* cited by examiner

SPACE REPORTING IN A STORAGE SYSTEM

CROSS-REFERENCE TO RELATED APPLICATION

This application is a non-provisional application for patent entitled to a filing date and claiming the benefit of earlier-filed U.S. Provisional Patent Application Ser. No. 62/368,776, filed on Jul. 29, 2016.

DESCRIPTION OF EMBODIMENTS

Figure 1:
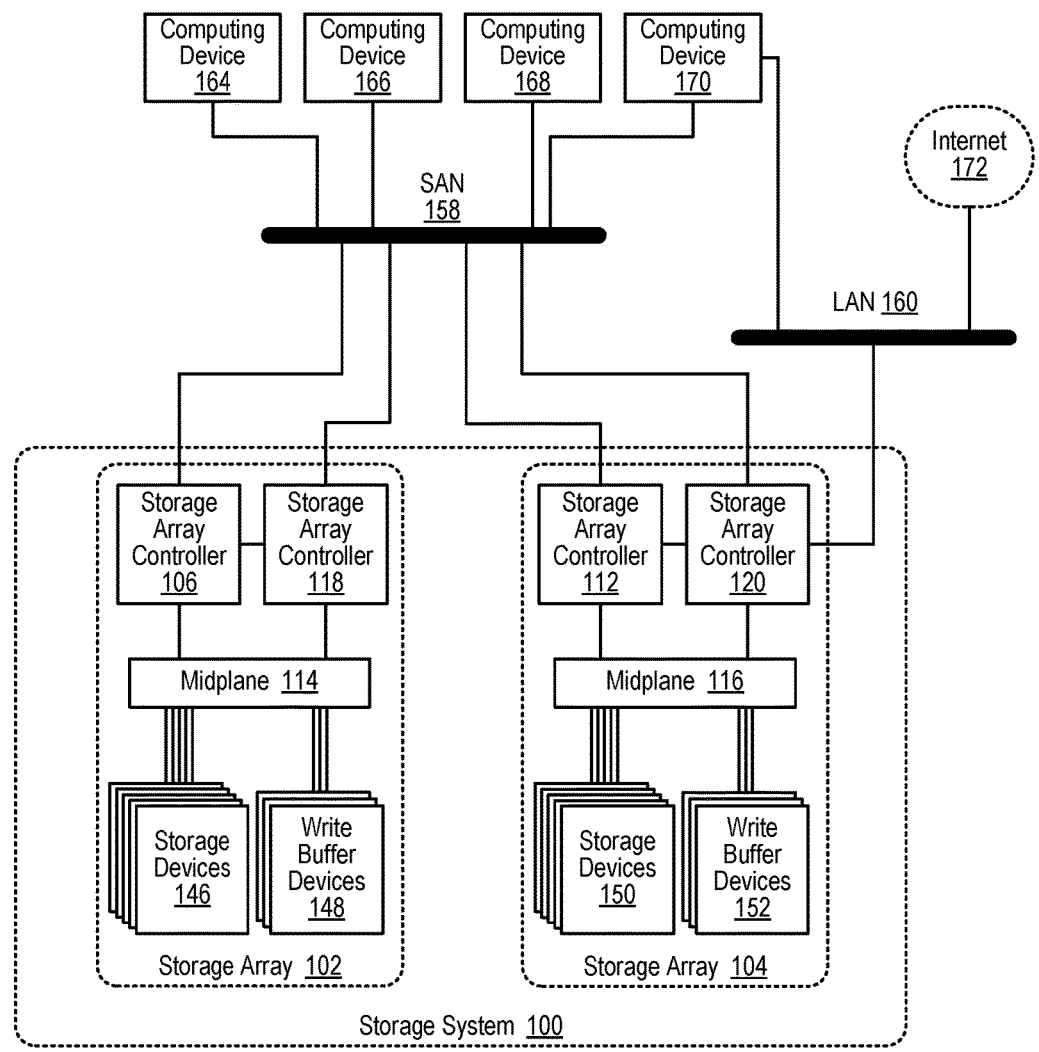
FIG. 1 sets forth a block diagram of a storage system configured for space reporting in a storage system according to embodiments of the present disclosure.

Example methods, apparatus, and products for space reporting in a storage system in accordance with the present invention are described with reference to the accompanying drawings, beginning with FIG. 1. FIG. 1 sets forth a block diagram of a storage system (100) configured for space reporting according to embodiments of the present disclosure.

The storage system (100) depicted in FIG. 1 includes a plurality of storage arrays (102, 104), although space reporting in a storage system in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network ('SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network (160) ('LAN'). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array (104) is expressly depicted as being coupled to the computing devices (164, 166, 168, 170) via the LAN (160), readers will appreciate that other storage arrays (102) in the storage system (100) may also be coupled to the computing devices (164, 166, 168, 170) via the same LAN (160) or via a different LAN.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). In the example of FIG. 1, writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one or the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one or the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in space reporting in a storage system according to embodiments of the present disclosure. The storage array controllers (106, 112) may assist in space reporting in a storage system by: determining, for one or more system-visible objects in the storage system, an amount of physical space and an amount of logical space consumed by each system-visible object; identifying, for each of the one or more system-visible objects in the storage system, one or more user-visible objects that reference the system-visible object; determining, for each of the one or more user-visible objects, an amount of physical space and an amount of logical space consumed by the user-visible object in dependence upon the amount of physical space and the amount of logical space consumed by each system-visible object referenced by the user-visible object; determining whether the amount of physical space consumed by a particular system-visible object is less than a previously determined amount of physical space consumed by the particular system-visible object; responsive to determining that the amount of physical space consumed by the particular system-visible object is less than the previously determined amount of physical space consumed by the particular system-visible object, reporting the particular system-visible object to a garbage collection process; reporting, to the garbage collection process, the difference between the amount of physical space consumed by the particular system-visible object and the previously determined amount of physical space consumed by the particular system-visible object; determining a resource utilization budget for space reporting; determining, in dependence upon the resource utilization budget for space reporting, a number of system-visible objects that can be analyzed in parallel; creating an object group that includes the number of system-visible objects that can be analyzed in parallel; determining the amount of physical space and logical space consumed by each system-visible object in the object group; identifying, each system-visible object in the object group, one or more user-visible objects that reference the system-visible object; attributing, to each of the one or more user-visible objects, the amount of physical space and logical space consumed by the user-visible object in dependence upon the amount of physical space and logical space consumed by each system-visible object in the object group that is referenced by the user-visible object; determining, in dependence upon the amount of physical space and logical space consumed by the user-visible object, an amount of data reduction associated with the user-visible object; determining, in dependence upon the amount of physical space and logical space consumed by all of the user-visible objects in the storage system, an amount of data reduction associated with the storage system; reporting the amount of physical space and the amount of logical space consumed by one or more user-visible objects; and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Space reporting in a storage system in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (202) useful in space reporting in a storage system according to embodiments of the present disclosure.

Figure 2:
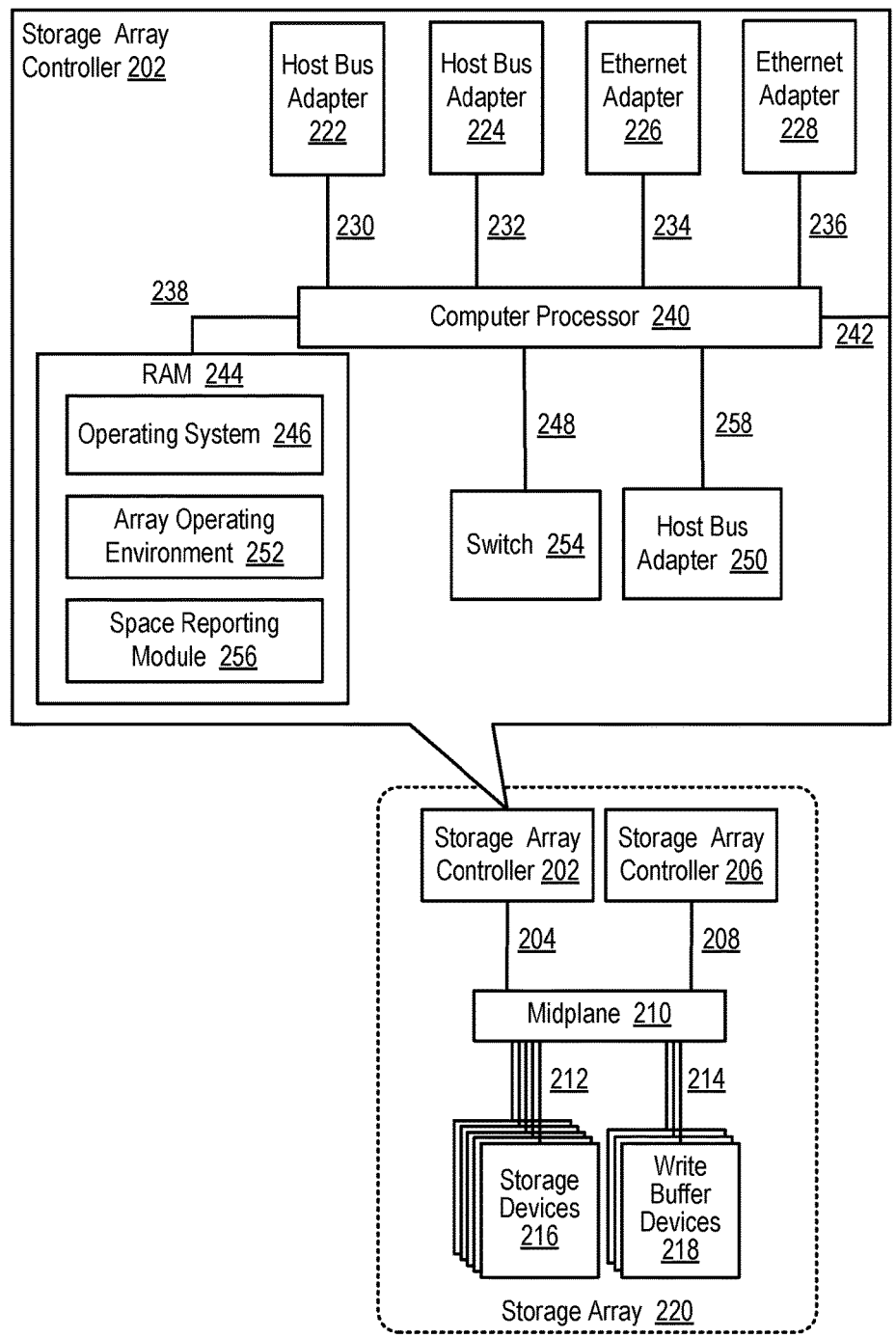
FIG. 2 sets forth a block diagram of a storage array controller useful in space reporting in a storage system according to embodiments of the present disclosure.

The storage array controllers (202, 206) depicted in FIG. 2 may be similar to the storage array controllers depicted in FIG. 1, as the storage array controllers (202, 206) of FIG. 2 may be communicatively coupled, via a midplane (210), to one or more storage devices (216) and to one or more write buffer devices (218) that are included as part of a storage array (220). The storage array controllers (202, 206) may be coupled to the midplane (210) via one or more data communications links (204, 208) and the midplane (206) may be coupled to the storage devices (216) and the memory buffer devices (218) via one or more data communications links (212, 214). The data communications links (204, 208, 212, 214) of FIG. 2 may be embodied, for example, as a Peripheral Component Interconnect Express ('PCIe') bus, as a Serial Attached SCSI ('SAS') data communications link, and so on. Although only one of the storage array controllers (202) is depicted in detail, readers will appreciate that other storage array controllers (206) may include similar components. For ease of explanation, however, the detailed view of one of the storage array controllers (202) will be described below.

The storage array controller (202) detailed in FIG. 2 can include at least one computer processor (240) or 'CPU' as well as random access memory ('RAM') (244). The computer processor (240) may be connected to the RAM (244) via a data communications link (238), which may be embodied as a high speed memory bus such as a Double-Data Rate 4 ('DDR4') bus. Although the storage array controller (202) detailed in FIG. 2 includes only a single computer processor, however, readers will appreciate that storage array controllers useful in space reporting in a storage system according to embodiments of the present disclosure may include additional computer processors. Likewise, although the storage array controller (202) detailed in FIG. 2 includes only a RAM (244), readers will appreciate that storage array controllers useful in space reporting in a storage system according to embodiments of the present disclosure may include additional forms of computer memory such as flash memory.

The storage array controller (202) detailed in FIG. 2 includes an operating system (246) that is stored in RAM (246). Examples of operating systems useful in storage array controllers (202, 206) configured for space reporting in a storage system according to embodiments of the present disclosure include UNIX™, Linux™, Microsoft Windows™, and others as will occur to those of skill in the art. The operating system (246) depicted in FIG. 2 may be embodied, for example, as system software that manages computer hardware and software resources on the storage array controller (202).

The storage array controller (202) detailed in FIG. 2 also includes an array operating environment (252) that is stored in RAM (252). The array operating environment (252) may be embodied as one or more modules of computer program instructions used to enable the storage array controller (202) to service access requests that are directed to the storage array (220). The array operating environment (252) may be responsible for generating I/O requests (e.g., read requests, write requests) that are sent to the storage devices (216) or the write buffer devices (218). The array operating environment (252) may be further configured to perform various functions that result in more efficient utilization of the resources within the storage array (220). The array operating environment (252) may be configured, for example, to compress data prior to writing the data to one of the storage devices (216), to perform data deduplication operations, to pool data that is to be written to one of the storage devices (216) so that data may be written in blocks of a predetermined size, and so on.

The storage array controller (202) detailed in FIG. 2 also includes a space reporting module (256), a module that includes computer program instructions useful in space reporting in a storage system according to embodiments of the present disclosure. The space reporting module (256) may be useful for space reporting in a storage system by: identifying, for a user-visible object in the storage system, one or more system-visible objects referenced by the user-visible object; determining, in dependence upon an amount of physical space consumed by each system-visible object referenced by the user-visible object and the amount of logical space consumed by each system-visible object referenced by the user-visible object, an amount of physical space consumed by the user-visible object and an amount of logical space consumed by the user-visible object; determining, for one or more system-visible objects in the storage system, an amount of physical space consumed by each system-visible object and an amount of logical space consumed by each system-visible object; determining whether the amount of physical space consumed by a particular system-visible object is less than a previously determined amount of physical space consumed by the particular system-visible object; responsive to determining that the amount of physical space consumed by the particular system-visible object is less than the previously determined amount of physical space consumed by the particular system-visible object, reporting the particular system-visible object to a garbage collection process; reporting, to the garbage collection process, the difference between the amount of physical space consumed by the particular system-visible object and the previously determined amount of physical space consumed by the particular system-visible object; determining a resource utilization budget for space reporting; determining, in dependence upon the resource utilization budget for space reporting, a number of system-visible objects that can be analyzed in parallel; creating an object group that includes the number of system-visible objects that can be analyzed in parallel; identifying one or more system-visible objects in the object group that are referenced by the user-visible object; determining, in dependence upon an amount of physical space consumed by each system-visible object in the object group that is referenced by the user-visible object and an amount of logical space consumed by each system-visible object in the object group that is referenced by the user-visible object, the amount of physical space consumed by the user-visible object and the amount of logical space consumed by the user-visible object; determining, in dependence upon the amount of physical space consumed by the user-visible object and the amount of logical space consumed by the user-visible object, an amount of data reduction associated with the user-visible object; determining, in dependence upon the amount of physical space consumed by a group of user-visible objects in the storage system and the amount of logical space consumed by the group of user-visible objects in the storage system, an amount of data reduction associated with the group of user-visible objects; reporting the amount of physical space consumed by one or more user-visible objects and the amount of logical space consumed by one or more user-visible objects; and performing others tasks as will be described in greater detail below.

The storage array controller (202) detailed in FIG. 2 also includes a plurality of host bus adapters (222, 224, 250) and Ethernet adapters (226, 228) that are coupled to the computer processor (240) via a data communications link (230, 232, 234, 236, 258). Each host bus adapter (222, 224, 250) may be embodied as a module of computer hardware that connects the host system (i.e., the storage array controller) to other network and storage devices. Each of the host bus adapters (222, 224, 250) of FIG. 2 may be embodied, for example, as a Fibre Channel adapter that enables the storage array controller (202) to connect to a SAN, as an Ethernet adapter that enables the storage array controller (202) to connect to a LAN, as a Target Channel Adapter, as a SCSI/Storage Target Adapter, and so on. Each of the host bus adapters (222, 224, 250) may be coupled to the computer processor (240) via a data communications link (230, 232, 258) such as, for example, a PCIe bus.

The storage array controller (202) detailed in FIG. 2 also includes a switch (254) that is coupled to the computer processor (240) via a data communications link (248). The switch (254) of FIG. 2 may be embodied as a computer hardware device that can create multiple endpoints out of a single endpoint, thereby enabling multiple devices to share what was initially a single endpoint. The switch (254) of FIG. 2 may be embodied, for example, as a PCIe switch that is coupled to a PCIe bus and presents multiple PCIe connection points to the midplane (210).

The storage array controller (202) of FIG. 2 may also include a data communications link (242) for coupling the storage array controller (202) to other storage array controllers (206). Such a data communications link (242) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
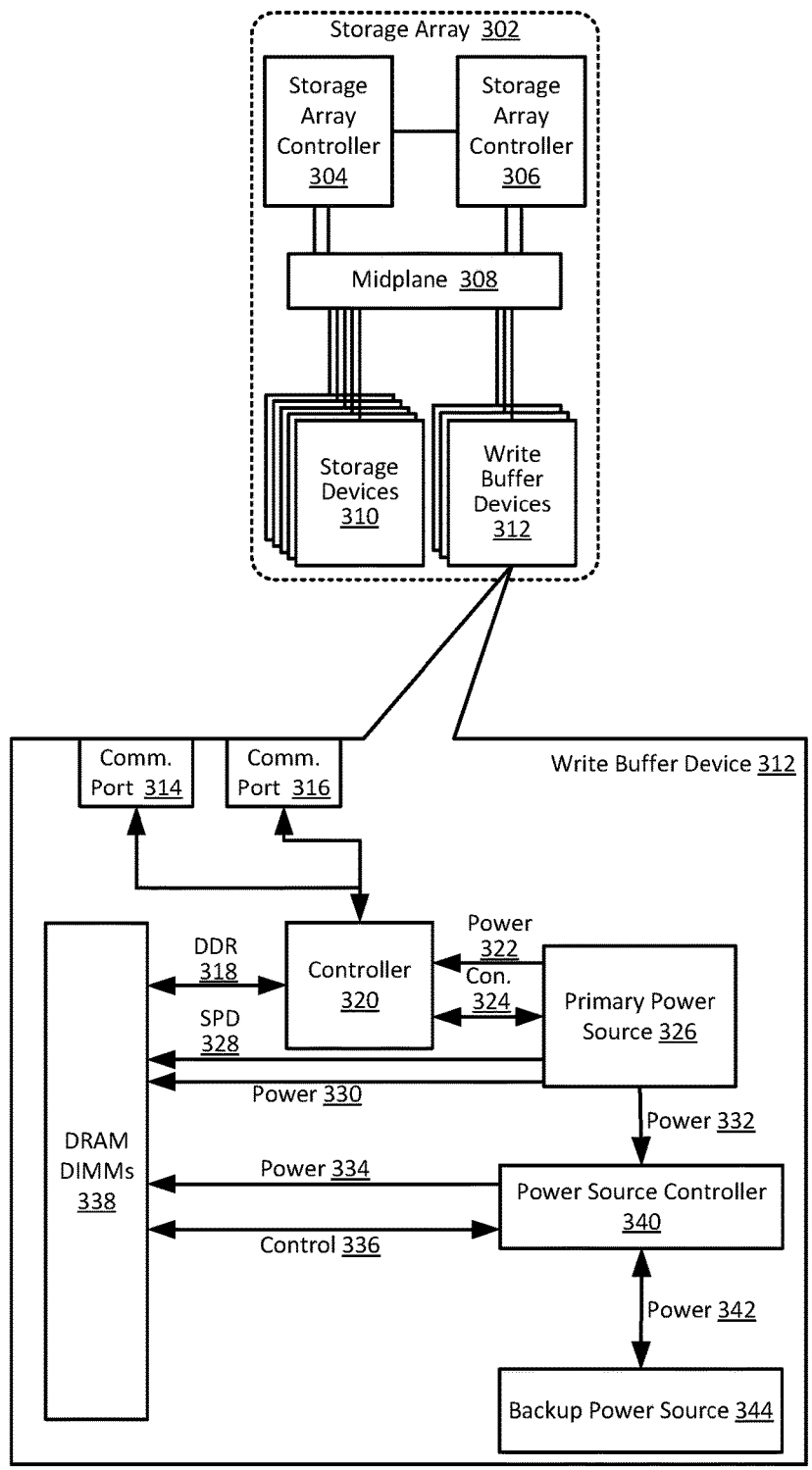
FIG. 3 sets forth a block diagram of a storage system configured for space reporting in a storage system according to embodiments of the present disclosure.

For further explanation, FIG. 3 sets forth a block diagram illustrating a write buffer device (312) useful in space reporting in a storage system according to embodiments of the present invention. The write buffer device (312) depicted in FIG. 3 is similar to the write buffer devices depicted in FIG. 1 and FIG. 2. The write buffer device (312) may be included in a storage array (302) that includes a plurality of storage array controllers (304, 306) that are communicatively coupled to a plurality of storage devices (310) and also communicatively coupled to a plurality of write buffer devices (312) via a midplane (308).

The write buffer device (312) depicted in FIG. 3 includes two data communications ports (314, 316). The data communications ports (314, 316) of FIG. 3 may be embodied, for example, as computer hardware for communicatively coupling the write buffer device (312) to a storage array controller (304, 306) via the midplane (308). For example, the write buffer device (312) may be communicatively coupled to the first storage array controller (304) via a first data communications port (314) and the write buffer device (312) may also be communicatively coupled to the second storage array controller (306) via a second data communications port (316). Although the write buffer device (312) depicted in FIG. 3 includes two data communications ports (314, 316), readers will appreciate that write buffer devices useful for buffering data to be written to an array of non-volatile storage devices may include only one data communications port or, alternatively, additional data communications ports not depicted in FIG. 3.

The write buffer device (312) depicted in FIG. 3 also includes a controller (320). The controller (320) depicted in FIG. 3 may be embodied, for example, as computer hardware for receiving memory access requests (e.g., a request to write data to memory in the write buffer device) via the data communications ports (314, 316) and servicing such memory access requests. The controller (320) depicted in FIG. 3 may be embodied, for example, as an ASIC, as a microcontroller, and so on. The controller (320) depicted in FIG. 3 may be communicatively coupled the data communications ports (314, 316), for example, via a PCIe data communications bus.

The write buffer device (312) depicted in FIG. 3 also includes a plurality of DRAM memory modules, embodied in FIG. 3 as DRAM dual in-line memory modules ('DIMMs') (338). The DRAM DIMMs (338) depicted in FIG. 3 may be coupled to the controller (320) via a memory bus such as a DDR (318) memory bus such that the controller (320) can be configured to write data to the DRAM DIMMs (338) via the DDR (318) memory bus.

The write buffer device (312) depicted in FIG. 3 also includes a primary power source (326). The primary power source (326) may be embodied as computer hardware for providing electrical power to the computing components that are within the write buffer device (312). The primary power source (326) may be embodied, for example, as a switched-mode power supply that supplies electric energy to an electrical load by converting alternating current ('AC') power from a mains supply to a direct current ('DC') power, as a DC-to-DC converter that converts a source of direct current (DC) from one voltage level to another, and so on. The primary power source (326) of FIG. 3 is coupled to the controller (320) via a power line (322) that the primary power source (326) can use to deliver power to the controller (320). The primary power source (326) of FIG. 3 is also coupled to the DRAM DIMMs (338) via a power line (330) that the primary power source (326) can use to deliver power to the DRAM DIMMs (338). The primary power source (326) of FIG. 3 is also coupled to a power source controller (340) via a power line (332) that the primary power source (326) can use to deliver power to the power source controller (340). The primary power source (326) can monitor which components are receiving power through the use of one or more control lines (324), serial presence detect ('SPD') lines (328), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (326).

The write buffer device (312) depicted in FIG. 3 also includes a backup power source (344). The backup power source (344) depicted in FIG. 3 represents a power source capable of providing power to the DRAM DIMMs (338) in the event that the primary power source (326) fails. In such a way, the DRAM DIMMs (338) may effectively serve as non-volatile memory, as a failure of the primary power source (326) will not cause the contents of the DRAM DIMMs (338) to be lost because the DRAM DIMMs (338) will continue to receive power from the backup power source (344). Such a backup power source (344) may be embodied, for example, as a supercapacitor.

The write buffer device (312) depicted in FIG. 3 also includes a power source controller (340). The power source controller (340) depicted in FIG. 3 may be embodied as a module of computer hardware configured to identify a failure of the primary power source (326) and to cause power to be delivered to the DRAM DIMMs (338) from the backup power source (344). In such an example, power may be delivered to the DRAM DIMMs (338) from the backup power source (344) via a first power line (342) between the power source controller (340) and the backup power source (344), as well as a second power line (334) between the backup power source controller (340) and the DRAM DIMMs (338). The backup power source controller (340) depicted in FIG. 3 may be embodied, for example, as an analog circuit, an ASIC, a microcontroller, and so on. The power source controller (340) can monitor whether the DRAM DIMMs (338) have power through the use of one or more control lines (336) that may be coupled to the DRAM DIMMs (338), as well as one or more control lines that may be coupled to the primary power source (326). In such an example, by exchanging signals between the DRAM DIMMs (338), the primary power source (326), and the power source controller (340), the power source controller (340) may identify whether power is being provided to the DRAM DIMMs (338) by the primary power source (326).

In the example depicted in FIG. 3, the controller (320) may be configured to receive, from a storage array controller (304, 306) via the one or more data communications ports (314, 316), an instruction to write data to the one or more DRAM DIMMs (338). Such an instruction may include, for example, the location at which to write the data, the data to be written to the DRAM DIMMs (338), the identity of the host that issued the instruction, the identity of a user associated with the instruction, or any other information needed to service the instruction. In the example depicted in FIG. 3, the NVRAM controller (320) may be further configured to write the data to the one or more DRAM DIMMs (338) in response to receiving such an instruction.

In the example depicted in FIG. 3, the controller (320) may be further configured to send an acknowledgment indicating that the data has been written to the array (302) of non-volatile storage devices in response to writing the data to the one or more DRAM DIMMs (338). The controller (320) may send the acknowledgment indicating that the data has been written to the array (302) of non-volatile storage devices in response to writing the data to the DRAM DIMMs (338) in the write buffer device (312). Readers will appreciate that although some forms of DRAM DIMMs (338) are considered to be volatile memory, because the DRAM DIMMs (338) are backed by redundant power sources (326, 344), writing the data to the DRAM DIMMs (338) in the write buffer device (312) may be treated the same as writing the data to traditional forms of non-volatile memory such as the storage devices (310). Furthermore, the DRAM DIMMs (338) in the write buffer device (312) can include one or more NVDIMMs. As such, once the data has been written to the DRAM DIMMs (338) in the write buffer device (312), an acknowledgement may be sent indicating that the data has been safely and persistently written to the array (302) of non-volatile storage devices.

In the example depicted in FIG. 3, the controller (320) may be further configured to determine whether the primary power source (326) has failed. The controller (320) may determine whether the primary power source (326) has failed, for example, by receiving a signal over the control line (324) indicating that the primary power source (326) has failed or is failing, by detecting a lack of power from the primary power source (326), and so on. In such an example, the controller (320) may be coupled to the backup power source (344) or may have access to another source of power such that the controller (320) can remain operational if the primary power source (326) does fail.

In the example depicted in FIG. 3, the controller (320) may be further configured to initiate a transfer of data contained in the one or more DRAM DIMMs (338) to flash memory in the write buffer device (312) in response to determining that the primary power source (326) has failed. The controller (320) may initiate a transfer of data contained in the one or more DRAM DIMMs (338) to flash memory in the write buffer device (312), for example, by signaling an NVDIMM to write the data contained in the one or more DRAM DIMMs (338) to flash memory on the NVDIMM.

Figure 4:
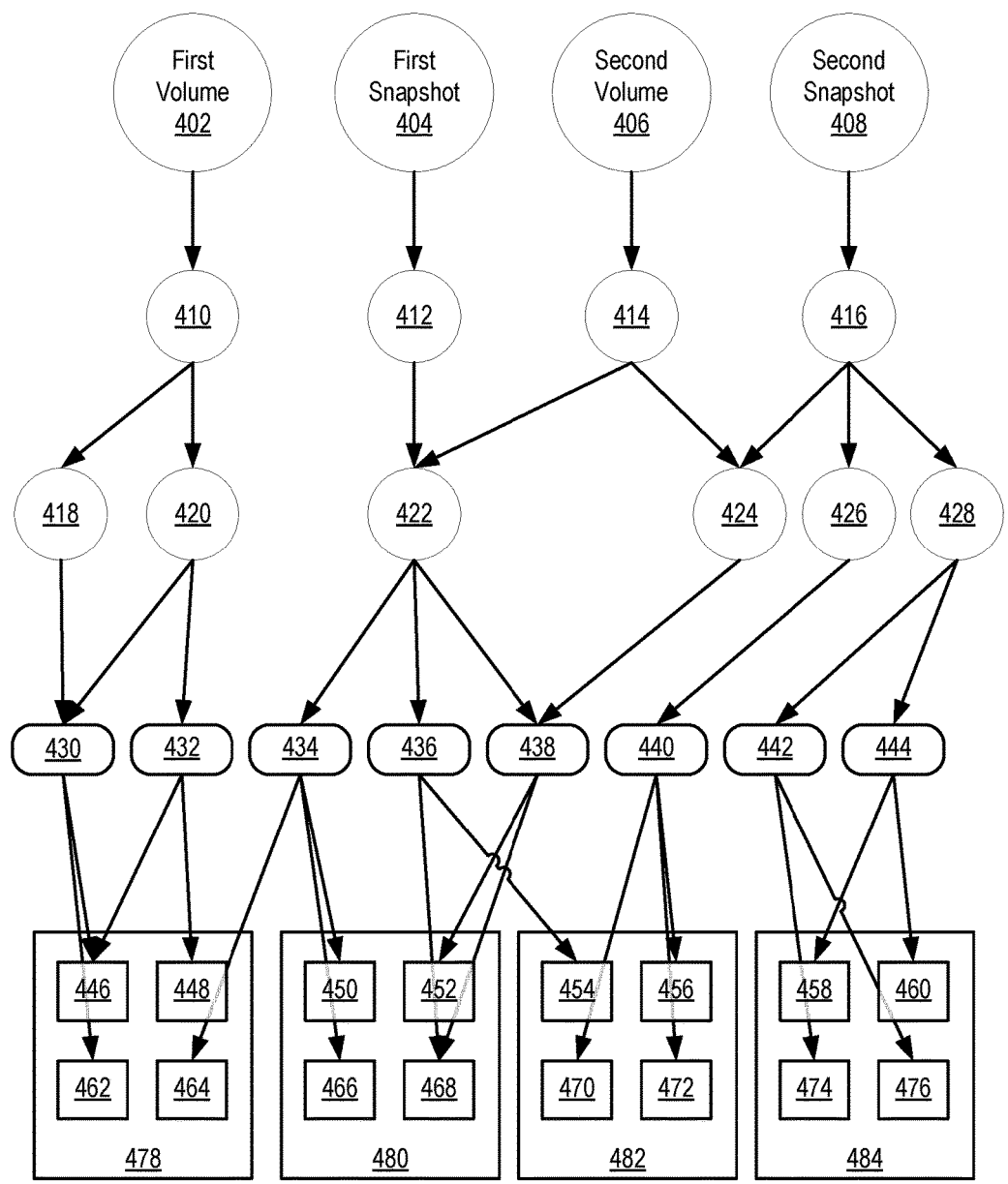
FIG. 4 sets forth a diagram of a graph representing data stored in the storage system configured for reporting space utilization according to embodiments of the present disclosure.

For further explanation, FIG. 4 sets forth a diagram of a graph representing data stored in the storage system configured for reporting space utilization according to embodiments of the present disclosure. The top of the graph depicted in FIG. 4 includes a first volume (402) and a second volume (406). Each of the volumes (402, 406) depicted in FIG. 4 may represent a user visible unit of data storage in the storage array that is referenced by a unique identifier. Each volume (402, 406) may be a logical construct such that the underlying physical storage that is used to store the data contained in a particular volume (402, 406) need not be contiguous or otherwise bounded to some physical construct such as a single drive, a single memory module, and so on.

The top of the graph depicted in FIG. 4 also includes a first snapshot (404) and a second snapshot (416). Each of the snapshots (404, 416) may represent a point-in-time copy of the content of a particular unit of data storage such as a volume (402, 406). Snapshots may be generated, for example, according to a predetermined schedule, upon the occurrence of a particular event, at the behest of a user or system administrator, and so on. Because many snapshots may be taken over time, a subsequently captured snapshot may include data that is identical to data in a previously captured snapshot. To that end, the module that performs the snapshot operation may be configured to not duplicate data from one snapshot to the next. Instead, a reference to the original data (which would otherwise be duplicated in subsequent snapshots) is included in the subsequent snapshot.

The graph depicted in FIG. 4 also includes a plurality of mediums (410, 412, 414, 416, 418, 420, 422, 424, 426, 428). Each of the mediums (410, 412, 414, 416, 418, 420, 422, 424, 426, 428) represent a logical grouping of data that may represent portions of a volume (402, 406) or a snapshot (404, 408). As is illustrated in FIG. 4, one medium may underlie another medium. For example, mediums (418, 420) underlie medium (410), medium (422) underlies mediums (412, 414), and so on. One medium may underlie another medium, for example, when the content of a portion of a medium changes while other portions of the medium remain unchanged.

The graph depicted in FIG. 4 also includes a plurality of extents (430, 432, 434, 436, 438, 440, 442, 444). In the example depicted in FIG. 4, each extent (430, 432, 434, 436, 438, 440, 442, 444) represents a logical grouping of storage on the storage array. Each of the extents (430, 432, 434, 436, 438, 440, 442, 444) may be variable in physical size, although each extent may have a maximum physical size, as each extent (430, 432, 434, 436, 438, 440, 442, 444) can only include up to a predetermined maximum number of segments (478, 480, 482, 484) and up to a predetermined maximum number of memory blocks (446, 448, 450, 452, 454, 456, 458, 460, 462, 464, 466, 468, 470, 472, 474, 476). Each memory block (446, 448, 450, 452, 454, 456, 458, 460, 462, 464, 466, 468, 470, 472, 474, 476) may be embodied as a unit of physical storage that have a fixed minimum size and a fixed maximum size. Because the size of each memory block (446, 448, 450, 452, 454, 456, 458, 460, 462, 464, 466, 468, 470, 472, 474, 476) is bounded by a fixed maximum size, and because the number of memory blocks (446, 448, 450, 452, 454, 456, 458, 460, 462, 464, 466, 468, 470, 472, 474, 476) that can be included in a segment (478, 480, 482, 484) is limited to fixed maximum number of memory blocks per segment, the size of a segment (478, 480, 482, 484) is also limited, although some segments may be of a variable size that is less than the upper limit and some segments may contain fewer memory blocks than the maximum number of memory blocks per segment. In view of the fact that each extent (430, 432, 434, 436, 438, 440, 442, 444) is composed of a fixed number of limited-size entities, the size of an extent (430, 432, 434, 436, 438, 440, 442, 444) is also limited.

Readers will appreciate that while the size of an extent (430, 432, 434, 436, 438, 440, 442, 444) is limited, the number of extents (430, 432, 434, 436, 438, 440, 442, 444) in a particular medium (410, 412, 414, 416, 418, 420, 422, 424, 426, 428) may be unlimited. Because the number of extents (430, 432, 434, 436, 438, 440, 442, 444) in a particular medium (410, 412, 414, 416, 418, 420, 422, 424, 426, 428) may be unlimited, the size of a particular medium (410, 412, 414, 416, 418, 420, 422, 424, 426, 428) may also be unlimited. The size of a particular volume (402, 406) or snapshot (404, 408) may also be unlimited given that the volumes (402, 406) and snapshots (404, 408) are composed of mediums (410, 412, 414, 416, 418, 420, 422, 424, 426, 428) whose sizes are unlimited. In alternative embodiments, a system administrator or other administrative entity may place limits on the number of extents (430, 432, 434, 436, 438, 440, 442, 444) that may be included in a particular medium (410, 412, 414, 416, 418, 420, 422, 424, 426, 428), a system administrator or other administrative entity may place limits on the number of mediums (410, 412, 414, 416, 418, 420, 422, 424, 426, 428) that may be included in a volume (402, 406) or snapshot (404, 408), or the system administrator or other administrative entity may otherwise limit the size of volumes (402, 406), snapshots (404, 408), and mediums (410, 412, 414, 416, 418, 420, 422, 424, 426, 428).

Readers will appreciate that graph representing data stored in a storage array is just one way of representing data stored in a storage array that is configured for reporting space utilization. In other embodiments, data stored in the storage array may be represented in different ways, using different structures, using additional structures, using fewer structures, and so on.

Figure 5:
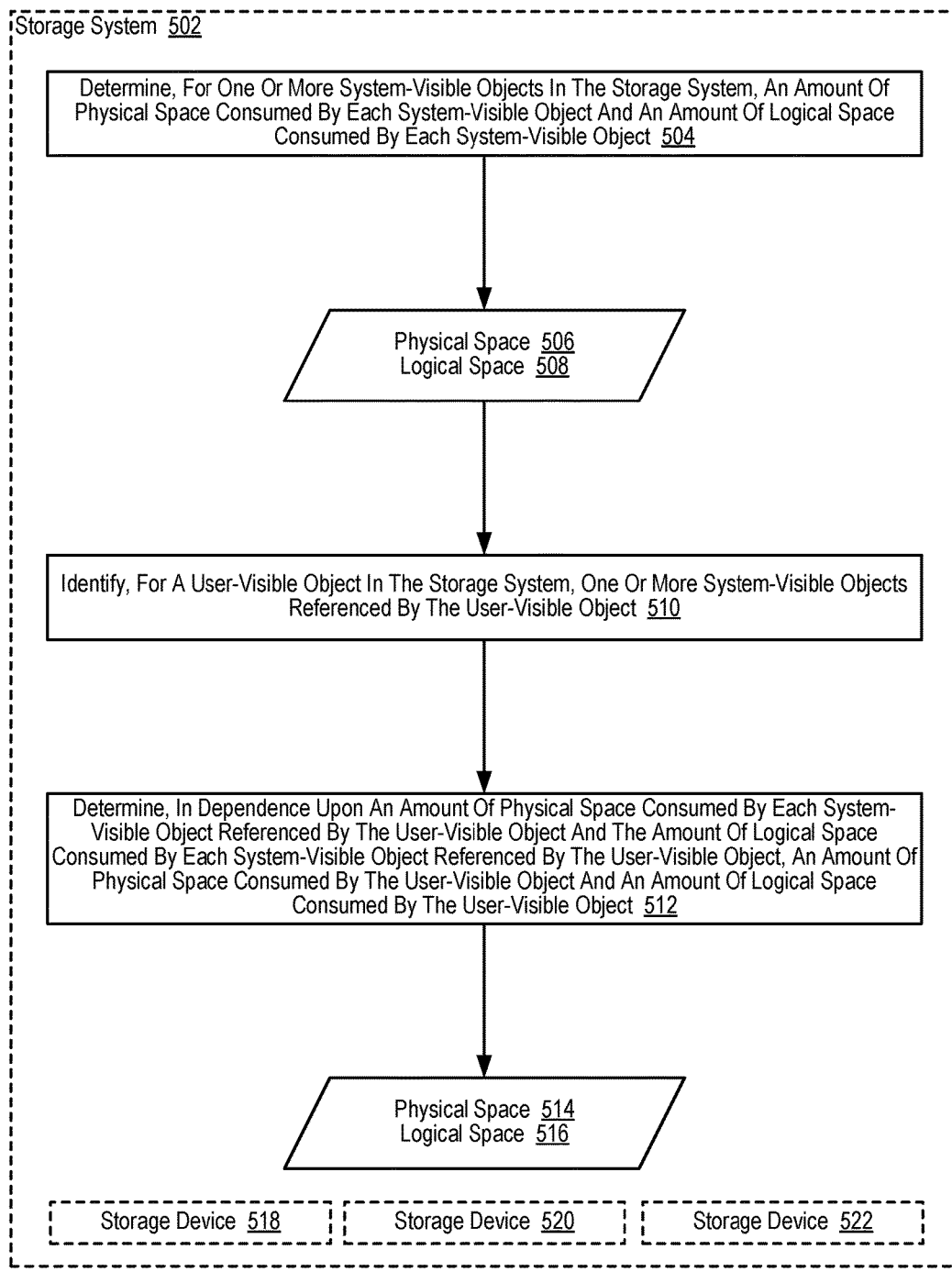
FIG. 5 sets forth a flow chart illustrating an example method of space reporting in a storage system according to embodiments of the present disclosure.

For further explanation, FIG. 5 sets forth a flow chart illustrating an example method of space reporting in a storage system (502) according to embodiments of the present disclosure. Although depicted in less detail, the storage system (502) depicted in FIG. 5 may be similar to the storage systems described above with reference to FIGS. 1-3. As such, the storage system (502) depicted in FIG. 5 may include a plurality of storage devices (518, 520, 522) such as a plurality of SSDs, as well as other components such as one or more storage array controllers, NVRAM storage devices, data communications apparatus such as a midplane, and so on.

The example method depicted in FIG. 5 includes determining (504), for one or more system-visible objects in the storage system (502), an amount of physical space (506) consumed by each system-visible object and an amount of logical space (508) consumed by each system-visible object. A system-visible object in the storage system (502) may be embodied, for example, as an extent such as the extents described above with reference to FIG. 4. The one or more system-visible objects in the storage system (502) may be objects that are only visible to system entities such as, for example, the array operating environment and the space reporting modules described above with reference to FIG. 2. Such system-visible objects may be distinguishable from user-visible objects such as, for example, the volumes and snapshots described above with reference to FIG. 4, as the system-visible objects are not visible to users of the storage system (502).

In the example method depicted in FIG. 5, the amount of physical space (506) consumed by each system-visible object and the amount of logical space (508) consumed by each system-visible object may be different values. Consider an example in which a user of the storage system (502) issues a request to the storage system (502) to write a 1 GB file to a particular volume. For ease of explanation, assume that the entire 1 GB file is ultimately written to a single system-visible object that includes no other data. The amount of logical space (508) consumed by such a system-visible object would be 1 GB, as the system-visible object contains data that spans 1 GB of an address space that is visible to the user. The amount of physical space (506) that is consumed by such a system-visible object, however, may be less than 1 GB as the result of applying various data reductions techniques (e.g., data compression) to the data itself.

In the example method depicted in FIG. 5, determining (504) the amount of physical space (506) consumed by each system-visible object and the amount of logical space (508) consumed by each system-visible object may be carried out, for example, by examining information generated by an extent summary module, by a space measurement module, or by one or more other modules in the storage system. In such an example, one or more of the modules in the storage system may be configured to maintain one or more data structures such as one or more tables that include information for each data object that is written to the storage system. The information for each data object that is written to the storage system may be created when the data object is first written to the storage system and may be updated as the data object is removed from the storage system, as the physical size of the data object changes in response to the application of data reduction techniques (e.g., deduplication, compression), and so on.

Consider an example in which a first data object that is 512 Kb in size is written as a first segment in a particular extent. Assume in such an example that a second data object that is 512 Kb in size is written as a second segment in a particular extent. In such an example, one or more modules in the storage system may be configured to maintain the following table:

TABLE 1

| Extent ID | Segment ID | Logical Space | Physical Space |
|---|---|---|---|
| Ext1 | Seg1 | 512 KB | 512 KB |
| Ext1 | Seg2 | 512 KB | 512 KB |

In the example described above, assume that data compression techniques are subsequently applied to the first data object, which reduces the physical size of the first data object by 128 KB. Further assume that data compression techniques are subsequently applied to the second data object, which reduces that physical size of the second data object by 256 KB. In such an example, one or more modules in the storage system may be configured to update the table depicted above, resulting in the following table being maintained:

TABLE 2

| Extent ID | Segment ID | Logical Space | Physical Space |
|---|---|---|---|
| Ext1 | Seg1 | 512 KB | 384 KB |
| Ext1 | Seg2 | 512 KB | 256 KB |

In such an example, determining (504) the amount of physical space (506) consumed by each system-visible object and the amount of logical space (508) consumed by each system-visible object may be carried out by examining such information for each of the system-visible objects. Readers will appreciate that in alternative embodiments, more or less information may be maintained for one or more system-visible objects, and such information may take other forms and be embodied in other data structures.

The example method depicted in FIG. 5 also includes identifying (510), for a user-visible object in the storage system (502), one or more system-visible objects referenced by the user-visible object. In the example method depicted in FIG. 5, identifying (510) one or more system-visible objects referenced by the user-visible object may be carried out, for example, by a space rollup module or other module in the storage system (502). Identifying (510) one or more system-visible objects referenced by the user-visible object may be carried out, for example, by traversing a data structure such as the graph representing data stored in the storage system (502) that is depicted in FIG. 4. In such an example, a space rollup module or other module in the storage system (502) may traverse the graph representing data stored in the storage system (502) that is depicted in FIG. 4 by starting at a node in the top of the graph that represents a user-visible object and following, level-by-level, links in lower levels of the graph to identify all system-visible objects that are referenced by the user-visible object.

As an example of identifying (510) one or more system-visible objects referenced by the user-visible object, the space rollup module or other module in the storage system (502) may traverse the graph representing data stored in the storage system (502) that is depicted in FIG. 4 in an effort to identify (510) one or more system-visible objects referenced by the first volume (402 of FIG. 4). Traversing the graph reveals that the first volume (402 of FIG. 4) references system-visible objects in the form of a first medium (410 of FIG. 4), a second medium (418 of FIG. 4), a third medium (420 of FIG. 4). Traversing the graph further reveals that the first volume (402 of FIG. 4) references system-visible objects in the form of a first extent (430 of FIG. 4) and a second extent (432 of FIG. 4), as well as three memory blocks (446, 448, and 462 of FIG. 4).

The example method depicted in FIG. 5 also includes determining (512), in dependence upon an amount of physical space (506) consumed by each system-visible object referenced by the user-visible object and the amount of logical space (508) consumed by each system-visible object referenced by the user-visible object, an amount of physical space (514) consumed by the user-visible object and an amount of logical space (516) consumed by the user-visible object. Determining (512) the amount of physical space (514) consumed by a particular user-visible object may be carried out, for example, by summing up the amount of physical space (506) that is consumed by each system-visible object referenced by the particular user-visible object. Determining (512) the amount of logical space (516) consumed by a particular user-visible object may similarly be carried out, for example, by summing up the amount of logical space (508) that is consumed by each system-visible object referenced by the particular user-visible object.

Figure 6:
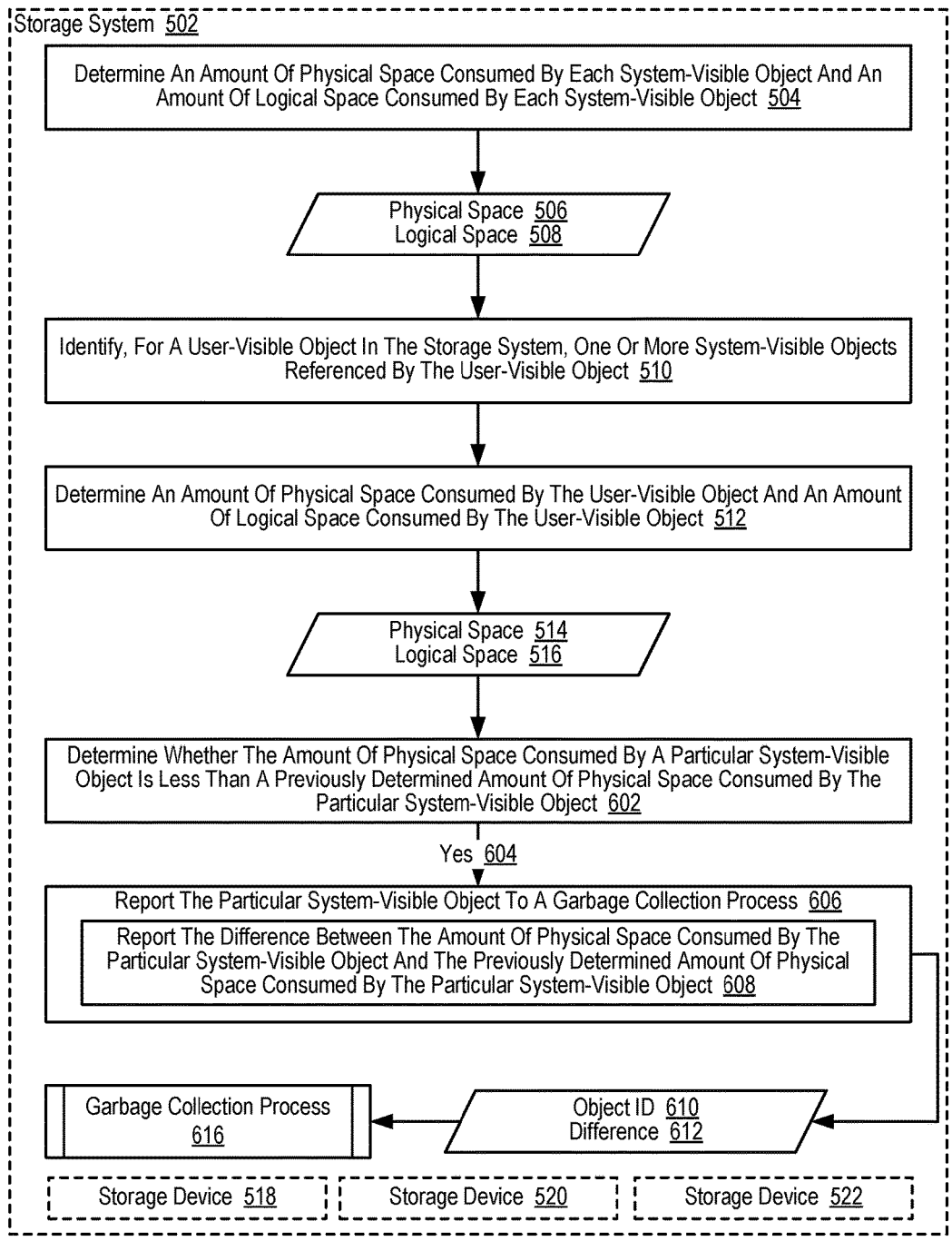
FIG. 6 sets forth a flow chart illustrating an additional example method of space reporting in a storage system according to embodiments of the present disclosure.

For further explanation, FIG. 6 sets forth a flow chart illustrating an additional example method of space reporting in a storage system (502) according to embodiments of the present disclosure. The example method depicted in FIG. 6 is similar to the example method depicted in FIG. 5, as the example method depicted in FIG. 6 also includes determining (504), for one or more system-visible objects in the storage system (502), an amount of physical space (506) consumed by each system-visible object and an amount of logical space (508) consumed by each system-visible object, identifying (510), for a user-visible object in the storage system (502), one or more system-visible objects referenced by the user-visible object, and determining (512), in dependence upon an amount of physical space (506) consumed by each system-visible object referenced by the user-visible object and the amount of logical space (508) consumed by each system-visible object referenced by the user-visible object, an amount of physical space (514) consumed by the user-visible object and an amount of logical space (516) consumed by the user-visible object.

The example method depicted in FIG. 6 also includes determining (602) whether the amount of physical space (514) consumed by a particular system-visible object is less than a previously determined amount of physical space consumed by the particular system-visible object. Readers will appreciate that each time that the amount of physical space (506) and the amount of logical space (508) consumed by each system-visible object is determined (504), information may be stored on one or more of the storage devices (518, 520, 522) that associates a particular system-visible object with the amount of physical space (506) consumed by the particular system-visible object. In such a way, when a subsequent determination of the amount of physical space (506) and the amount of logical space (508) consumed by each system-visible object is made, the previously determined amount of physical space consumed by the particular system-visible object may be retrieved from the one or more of the storage devices (518, 520, 522) and compared to the most recently determined amount of physical space (514) that is consumed by the particular system-visible object to determining (602) whether the amount of physical space (514) consumed by a particular system-visible object is less than a previously determined amount of physical space consumed by the particular system-visible object.

Consider an example in which the storage system (502) determines (504) the amount of physical space (506) and the amount of logical space (508) consumed by a first system-visible object at a first point in time. In such an example, the storage system (502) may store a unique identifier for the first system-visible object along with information describing the amount of physical space (506) consumed by the first system-visible object on a first storage device (518). Further assume that at a later, second point in time, the storage system (502) again determines (504) the amount of physical space (506) and the amount of logical space (508) consumed by the first system-visible object. In such an example, determining (602) whether the amount of physical space (514) that is consumed by the first system-visible object is less than a previously determined amount of physical space consumed by the first system-visible object may be carried out by retrieving the information describing the amount of physical space (506) consumed by the first system-visible object from the first storage device (518) and comparing such information to the amount of physical space (506) that is consumed by the first system-visible object as determined (504) at the later, second point in time. Readers will appreciate that when the amount of physical space (514) consumed by a particular system-visible object is less than a previously determined amount of physical space consumed by the particular system-visible object, data associated with the system-visible object may have become stale and data stored within the storage system (502) may be a candidate for garbage collection.

Consider an example in which the system-visible object is embodied as a medium that was created in response to a user request to write a 10 MB chunk of data to the storage system (502). For ease of explanation, assume that no data reduction techniques are applied to the 10 MB chunk of data such that all 10 MB of data is ultimately stored on a particular storage device (518) in the storage system (502). In such an example, the medium may be mapped to the location within the particular storage device (518) where the 10 MB of data is stored and the amount of physical space that is consumed by the medium would be set to a value of 10 MB. In such an example, assume that the user subsequently issues a request to delete the 10 MB chunk of data and that the storage system (502) services such a request not by immediately deleting the contents of the particular storage device (518) but rather by unmapping the medium from the location within the particular storage device (518) where the 10 MB of data is stored and also causing the amount of physical space that is consumed by the medium to be reset to a value of 0 MB. In such an example, by determining (602) that the amount of physical space (0 MB) that consumed by the medium is less than a previously determined amount of physical space (10 MB) that was consumed by the medium, the location within the particular storage device (518) where the 10 MB of data is stored may be identified as a good candidate for garbage collection.

The example method depicted in FIG. 6 also includes, in response to affirmatively (604) determining that the amount of physical space (514) consumed by the particular system-visible object is less than the previously determined amount of physical space consumed by the particular system-visible object, reporting (606) the particular system-visible object to a garbage collection process (616). In the example method depicted in FIG. 6, reporting (606) the particular system-visible object to a garbage collection process (616) may be carried out, for example, by sending a message to the garbage collection process (616) that includes an object identifier (610) or other information associated with the particular system-visible object, by storing information associated with the particular system-visible object at a location within the storage array (502) that is monitored by the garbage collection process (616), and in other ways.

Readers will appreciate that by reporting (606) the particular system-visible object to the garbage collection process (616), the garbage collection process (616) may target areas of the storage system (502) that are more likely to contain garbage (i.e., stale data) rather than randomly searching the storage array (502) for garbage. Through the use of a more informed garbage collection process (616), overall system performance may be improved. For example, overall system performance may be improved because garbage may be collected more promptly, thereby more promptly freeing capacity within the storage system (502). Overall system performance may similarly be improved because the garbage collection process (616) may require smaller amounts of system resources to execute because the garbage collection process may examine targeted locations rather than scanning the entire storage space, thereby freeing those system resources for other tasks such as servicing I/O requests, and so on.

In the example method depicted in FIG. 6, reporting (606) the particular system-visible object to a garbage collection process (616) can include reporting (608), to the garbage collection process (616), the difference (612) between the amount of physical space (514) consumed by the particular system-visible object and the previously determined amount of physical space consumed by the particular system-visible object. In the example method depicted in FIG. 6, the difference (612) between the amount of physical space (514) consumed by the particular system-visible object and the previously determined amount of physical space consumed by the particular system-visible object may be used by the garbage collection process (616) to prioritize garbage collection. For example, if the difference (612) between the amount of physical space (514) that is consumed by a first system-visible object and the previously determined amount of physical space that was consumed by the first system-visible object is 1 MB and the difference (612) between the amount of physical space (514) that is consumed by a second system-visible object and the previously determined amount of physical space that was consumed by the second system-visible object is 500 MB, garbage collection of the second system-visible object may be prioritized over garbage collection of the first system-visible object as more capacity can be made available by garbage collecting the data that is associated with the second system-visible object. Alternatively, garbage collection of the first system-visible object may be prioritized over garbage collection of the second system-visible object as additional capacity may be made available more quickly by garbage collecting the data that is associated with the first system-visible object.

Figure 7:
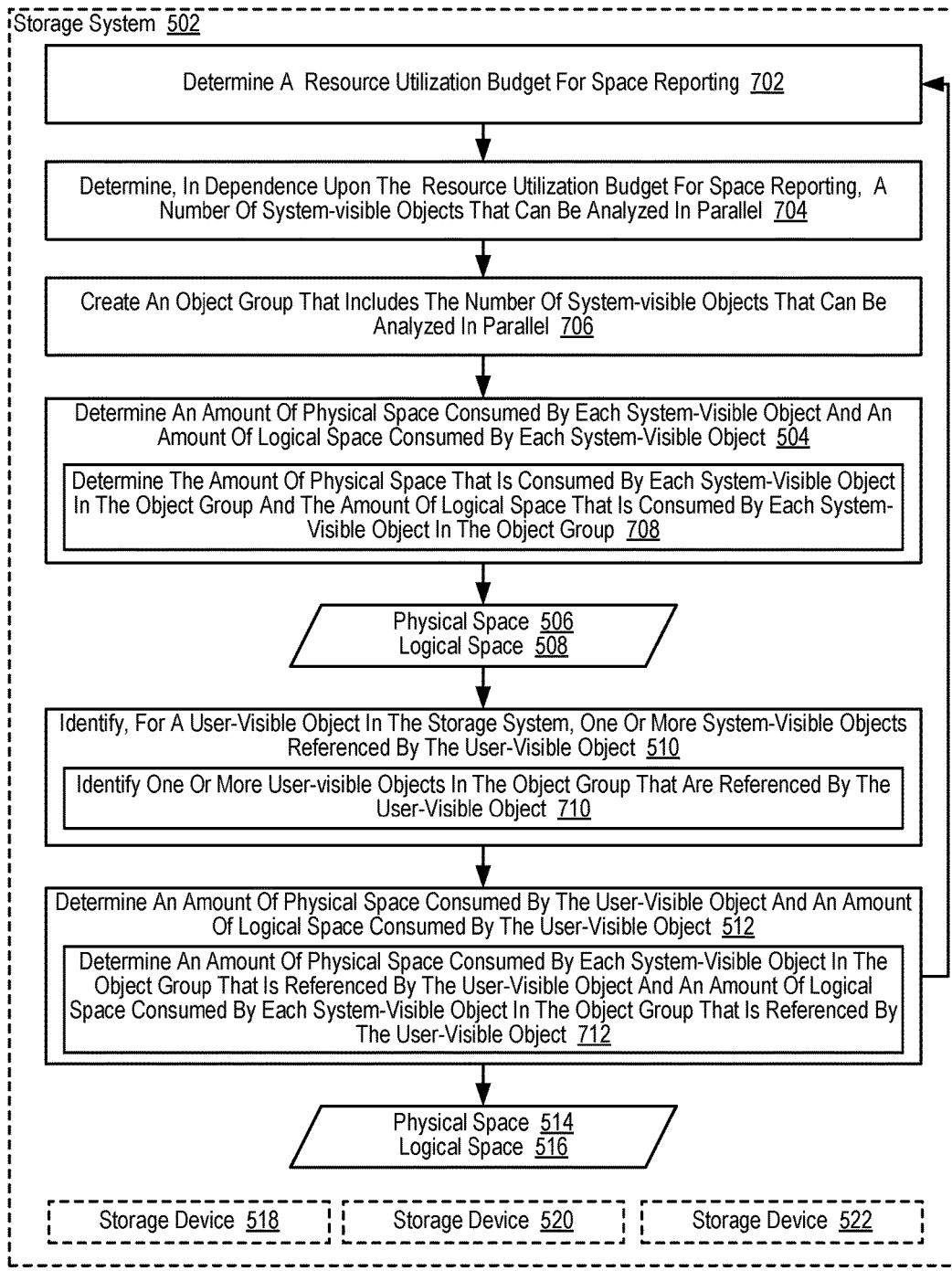
FIG. 7 sets forth a flow chart illustrating an additional example method of space reporting in a storage system according to embodiments of the present disclosure.

For further explanation, FIG. 7 sets forth a flow chart illustrating an additional example method of space reporting in a storage system (502) according to embodiments of the present disclosure. The example method depicted in FIG. 7 is similar to the example method depicted in FIG. 5, as the example method depicted in FIG. 7 also includes determining (504), for one or more system-visible objects in the storage system (502), an amount of physical space (506) consumed by each system-visible object and an amount of logical space (508) consumed by each system-visible object, identifying (510), for a user-visible object in the storage system (502), one or more system-visible objects referenced by the user-visible object, and determining (512), in dependence upon an amount of physical space (506) consumed by each system-visible object referenced by the user-visible object and the amount of logical space (508) consumed by each system-visible object referenced by the user-visible object, an amount of physical space (514) consumed by the user-visible object and an amount of logical space (516) consumed by the user-visible object.

The example method depicted in FIG. 7 also includes determining (702) a resource utilization budget for space reporting. The resource utilization budget for space reporting may specify an amount of resources that may be utilized to for performing steps such as determining (504) an amount of physical space (506) and an amount of logical space (508) consumed by each system-visible object, identifying (510) one or more user-visible objects that reference each of the one or more system-visible objects in the storage system (502), determining (512) an amount of physical space (514) and an amount of logical space (516) that consumed by for of the one or more user-visible objects, and other steps that are useful for space reporting in a storage system (502). The resource utilization budget for space reporting may include, for example, an amount of processing cycles that may be dedicated to performing steps associated with space reporting in the storage system (502), an amount of memory that may be dedicated to performing steps associated with space reporting in the storage system (502), an amount of time that may be dedicated to performing steps associated with space reporting in the storage system (502), an amount of network bandwidth that may be dedicated to performing steps associated with space reporting in the storage system (502), and many other quantifiable resources, as well as any combination of such resources. Determining (702) a resource utilization budget for space reporting may be carried out, for example, by querying a system management module or other module such as the array operating environment depicted in FIG. 2 for information describing how many resources are currently available for performing steps associated with space reporting in the storage system (502), by examining or more configuration parameters for information describing how many resources may be used for performing steps associated with space reporting in the storage system (502), and in other ways.

The example method depicted in FIG. 7 also includes determining (704), in dependence upon the resource utilization budget for space reporting, a number of system-visible objects that can be analyzed in parallel. Determining (704) a number of system-visible objects that can be analyzed in parallel may be carried out, for example, through the use of information describing the amount of resources required to perform space reporting analysis on a single system-visible object, through the use of information describing the amount of resources required to perform space reporting analysis on a single system-visible object that is at a particular level in a graph such as the graph depicted in FIG. 4, through the use of information describing the amount of resources required to perform space reporting analysis on one or more levels in a graph such as the graph depicted in FIG. 4, and any other form of information that describes the amount of resources required to perform space reporting analysis on one or more system-visible objects. In such an example, the resource utilization budget for space reporting may be divided by the amount of resources required to perform space reporting analysis on one or more system-visible objects to determine (704) a number of system-visible objects that can be analyzed in parallel. Such information may be obtained, for example, by extracting such information from one or more system configuration parameters, by tracking the amount of resources required to perform space reporting analysis on one or more system-visible objects, and in other ways.

Consider an example in which the resource utilization budget for space reporting indicates that 1 GB of memory may be dedicated to performing steps associated with space reporting in the storage system (502). In such an example, assume that the amount of memory required to perform space reporting analysis on a single system-visible object is determined to be 1 KB on average, as determined through historical tracking of resource utilization when performing space reporting analysis on many system-visible objects. In such an example, determining (704) a number of system-visible objects that can be analyzed in parallel in dependence upon the resource utilization budget for space reporting may be carried out by dividing the 1 GB of memory that may be dedicated to performing steps associated with space reporting in the storage system (502) by the 1 KB amount of memory that is required to perform space reporting analysis on a single system-visible object, yielding a determination that roughly 1,000,000 system-visible objects may be analyzed in parallel without utilizing more memory than the 1 GB of memory that is dedicated to performing steps associated with space reporting in this example.

The example method depicted in FIG. 7 also includes creating (706) an object group that includes the number of system-visible objects that can be analyzed in parallel. In the example method depicted in FIG. 7, an object group represents a logical grouping of system-visible objects that are to be analyzed in parallel. Continuing with the example from the preceding paragraph in which roughly 1,000,000 system-visible objects may be analyzed in parallel without exceeding a resource utilization budget for space reporting, an object group may be created (706) that includes 1,000,000 system-visible objects that are to be analyzed in parallel. Readers will appreciate that in such an example, once space reporting analysis has been completed for a particular object group, steps 702, 704, and 706 may be iteratively repeated to create new, non-overlapping object groups until space reporting analysis has been completed for all system-visible objects in the storage system (502).

In the example method depicted in FIG. 7, determining (504), for one or more system-visible objects in the storage system (502), an amount of physical space (506) consumed by each system-visible object and an amount of logical space (508) consumed by each system-visible object can include determining (708) the amount of physical space (506) that is consumed by each system-visible object in the object group and the amount of logical space (508) that is consumed by each system-visible object in the object group. Determining (708) the amount of physical space (506) that is consumed by each system-visible object in the object group and the amount of logical space (508) that is consumed by each system-visible object in the object group may be carried out, for example, by examining information generated by an extent summary module, by a space measurement module, or by one or more other modules in the storage system. In such an example, one or more of the modules in the storage system may be configured to maintain one or more data structures such as one or more tables that include information for each data object that is written to the storage system. The information for each data object that is written to the storage system may be created when the data object is first written to the storage system and may be updated as the data object is removed from the storage system, as the physical size of the data object changes in response to the application of data reduction techniques (e.g., deduplication, compression), and so on. In such an example, determining (708) the amount of physical space (506) that is consumed by each system-visible object in the object group and the amount of logical space (508) that is consumed by each system-visible object in the object group may be carried out by examining such information for each of the system-visible objects in the object group. Readers will appreciate that in alternative embodiments, more or less information may be maintained for one or more system-visible objects in the object group, and such information may take other forms and be embodied in other data structures.

In the example method depicted in FIG. 7, identifying (510), for a user-visible object in the storage system (502), one or more system-visible objects referenced by the user-visible object can include identifying (710) one or more user-visible objects in the object group that are referenced by the user-visible object. Identifying (710) one or more user-visible objects in the object group that are referenced by the user-visible object may be carried out, for example, by a space rollup module or other module in the storage system (502). Identifying (710) one or more user-visible objects in the object group that are referenced by the user-visible object may be carried out, for example, by traversing a data structure such as the graph representing data stored in the storage system (502) that is depicted in FIG. 4. In such an example, a space rollup module or other module in the storage system (502) may traverse the graph representing data stored in the storage system (502) that is depicted in FIG. 4 by starting at a node in the top of the graph that represents a user-visible object and following, level-by-level, links in lower levels of the graph to identify all system-visible objects in the object group that are referenced by the user-visible object.

In the example method depicted in FIG. 7, determining (512) an amount of physical space (514) consumed by the user-visible object and an amount of logical space (516) consumed by the user-visible object can include determining (712) an amount of physical space (514) consumed by each system-visible object in the object group that is referenced by the user-visible object and an amount of logical space (516) consumed by each system-visible object in the object group that is referenced by the user-visible object. In the example method depicted in FIG. 5, the amount of physical space (514) consumed by the user-visible object and an amount of logical space (516) consumed by the user-visible object is determined (512) in dependence upon the amount of physical space (506) consumed by each system-visible object that is in the object group and referenced by the user-visible object and the amount of logical space (508) consumed by each system-visible object that is in the object group and referenced by the user-visible object. Determining (712) the amount of physical space (514) consumed by each system-visible object in the object group that is referenced by the user-visible object may be carried out, for example, by summing up the amount of physical space (506) that is consumed by each system-visible object in the object group that is referenced by the particular user-visible object. Determining (712) the amount of logical space (516) consumed by each system-visible object in the object group that is referenced by the user-visible object may similarly be carried out, for example, by summing up the amount of logical space (508) that is consumed by each system-visible object in the object group that is referenced by the particular user-visible object. Readers will appreciate that as space reporting analysis is carried out for additional, non-overlapping object groups, the amount of physical space (514) and an amount of logical space (516) consumed by the user-visible object may be updated as system-visible entities in the additional, non-overlapping object groups are identified which reference the user-visible object.

Readers will appreciate that resources in the storage system (502) such as, for example, a storage array controller may be configured to carry out the steps described above. Readers will appreciate that the operation of a resource such as a storage array controller may be improved by implementing the steps described above. For example, by limiting the space reporting analysis to particular groups of objects, the amount of system resources (e.g., memory in the storage array controller) that may be utilized when performing space reporting analysis can be limited, whereas performing space reporting analysis on all objects in the storage system may require such a large amount of system resources that the storage array controller is unable to perform other tasks such as servicing I/O requests.

Figure 8:
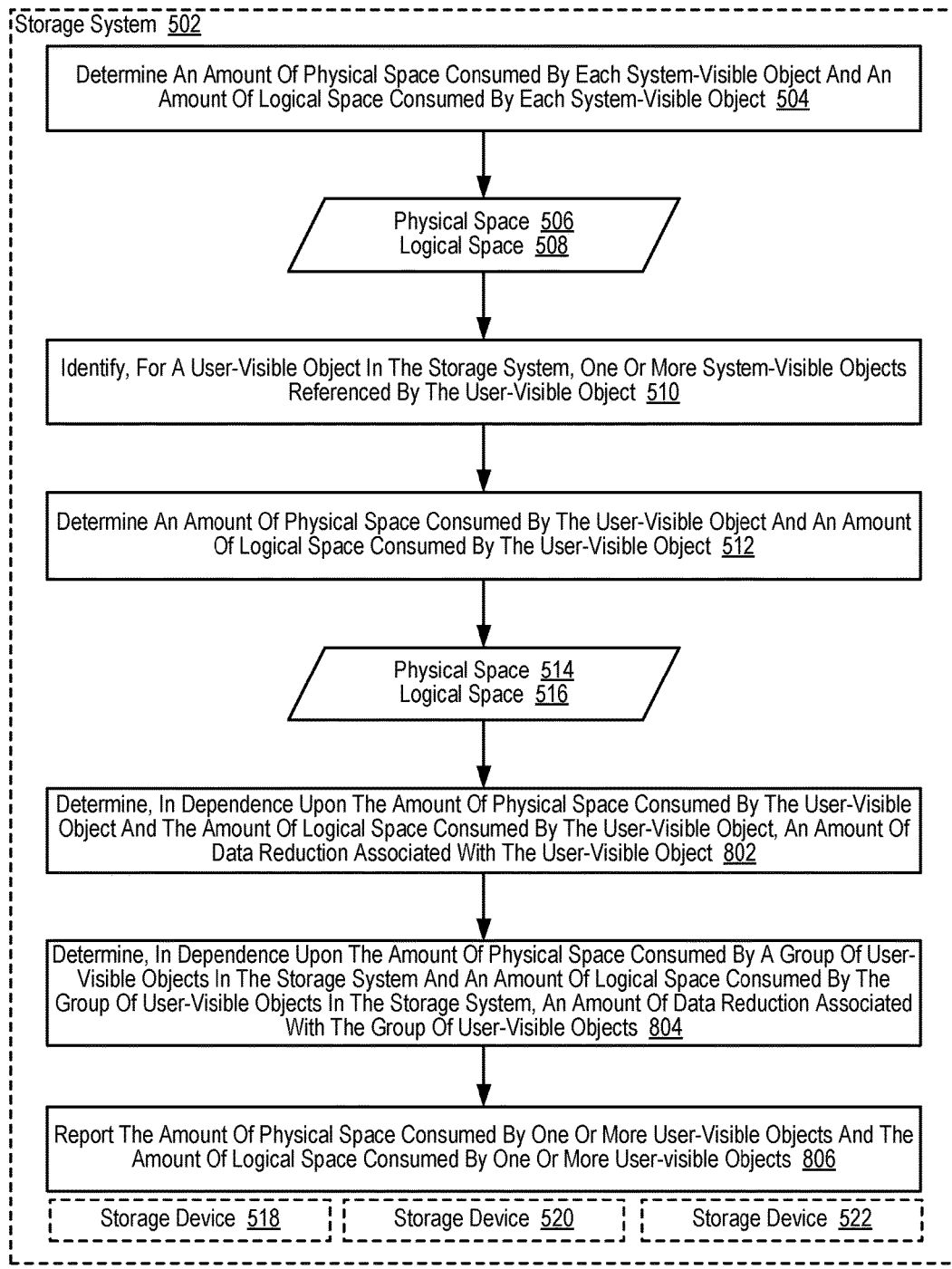
FIG. 8 sets forth a flow chart illustrating an additional example method of space reporting in a storage system according to embodiments of the present disclosure.

For further explanation, FIG. 8 sets forth a flow chart illustrating an additional example method of space reporting in a storage system (502) according to embodiments of the present disclosure. The example method depicted in FIG. 8 is similar to the example method depicted in FIG. 5, as the example method depicted in FIG. 8 also includes determining (504), for one or more system-visible objects in the storage system (502), an amount of physical space (506) consumed by each system-visible object and an amount of logical space (508) consumed by each system-visible object, identifying (510), for a user-visible object in the storage system (502), one or more system-visible objects referenced by the user-visible object, and determining (512), in dependence upon an amount of physical space (506) consumed by each system-visible object referenced by the user-visible object and the amount of logical space (508) consumed by each system-visible object referenced by the user-visible object, an amount of physical space (514) consumed by the user-visible object and an amount of logical space (516) consumed by the user-visible object.

The example method depicted in FIG. 8 also includes determining (802), in dependence upon the amount of physical space (514) consumed by the user-visible object and the amount of logical space (516) consumed by the user-visible object, an amount of data reduction associated with the user-visible object. Determining (802) an amount of data reduction associated with the user-visible object in dependence upon the amount of physical space (514) consumed by the user-visible object and the amount of logical space (516) consumed by the user-visible object may be carried out, for example, by dividing the amount of logical space (516) that is consumed by the user-visible object by the amount of physical space (514) that is consumed by the user-visible object. Consider an example in which a user issues a request to write 4 MB to a user-visible entity such as a volume but through data reduction techniques, only 1 MB of data is actually written to the storage system. In such an example, the amount of logical space (516) that is consumed by the user-visible object would be set to a value of 4 MB and the amount of physical space (514) that is consumed by the user-visible object would be set to a value of 1 MB, resulting in a 4:1 data reduction rate.

The example method depicted in FIG. 8 also includes determining (804), in dependence upon the amount of physical space consumed by a group of user-visible objects in the storage system and an amount of logical space consumed by the group of user-visible objects in the storage system, an amount of data reduction associated with the group of user-visible objects. Determining (804) an amount of data reduction associated with the group of user-visible objects in dependence upon the amount of physical space consumed by the group of user-visible objects in the storage system and the amount of logical space consumed by the group of user-visible objects in the storage system may be carried out, for example, by summing up the amount of physical space that is consumed by each user-visible object in the group of user-visible objects and also summing up the amount of logical space that is consumed by each user-visible object in the group of user-visible objects. In such an example, determining (804) an amount of data reduction associated with the group of user-visible objects may be carried out by dividing the total amount of logical space that is consumed by each of the user-visible objects in the group by the total amount of physical space that is consumed by each of the user-visible objects in the group.

Consider an example in which the group of user-visible objects includes three snapshots. In such an example, assume that the first snapshot consumes 2 GB of logical space and 0.5 GB of physical space, assume that the second snapshot consumes 6 GB of logical space and 2 GB of physical space, and assume that the third snapshot consumes 4 GB of logical space and 1.5 GB of physical space. In such an example, the total amount of logical space consumed by the group of snapshots is 12 GB and the total amount of physical space that is consumed by the group of snapshots is 4 GB, resulting in a data reduction ratio of 3:1.

Readers will appreciate that the group of user-visible objects for which an amount of data reduction is determined (804) may be selected in a variety of ways. For example, a configuration setting may be used to select the members of the group, a user of the storage system (502) such as a system administrator or support technician may select the members of the group through a user interface, and so on. In such a way, groups may be created to help determine the amount of data reduction being achieved for various logical groupings of user-visible objects. For example, a first group may be created that includes all or substantially all volumes in the storage system (502) and a second group may be created that includes all or substantially all snapshots in the storage system (502), such that data reduction may be measured for volumes separately from measuring data reduction for snapshots. Readers will appreciate that many other types of groups may be created in many other ways.

The method of claim 1 further comprising reporting (806) the amount of physical space consumed by one or more user-visible objects and the amount of logical space consumed by one or more user-visible objects. Reporting (806)

the amount of physical space consumed by one or more user-visible objects and the amount of logical space consumed by one or more user-visible objects may be carried, for example, by presenting the amount of physical space consumed by one or more user-visible objects and the amount of logical space consumed by one or more user-visible objects on a GUI that is available to a user of the storage system (502), by generating a report that includes information describing the amount of physical space consumed by one or more user-visible objects and the amount of logical space consumed by one or more user-visible objects, and in other ways.

Figure 9:
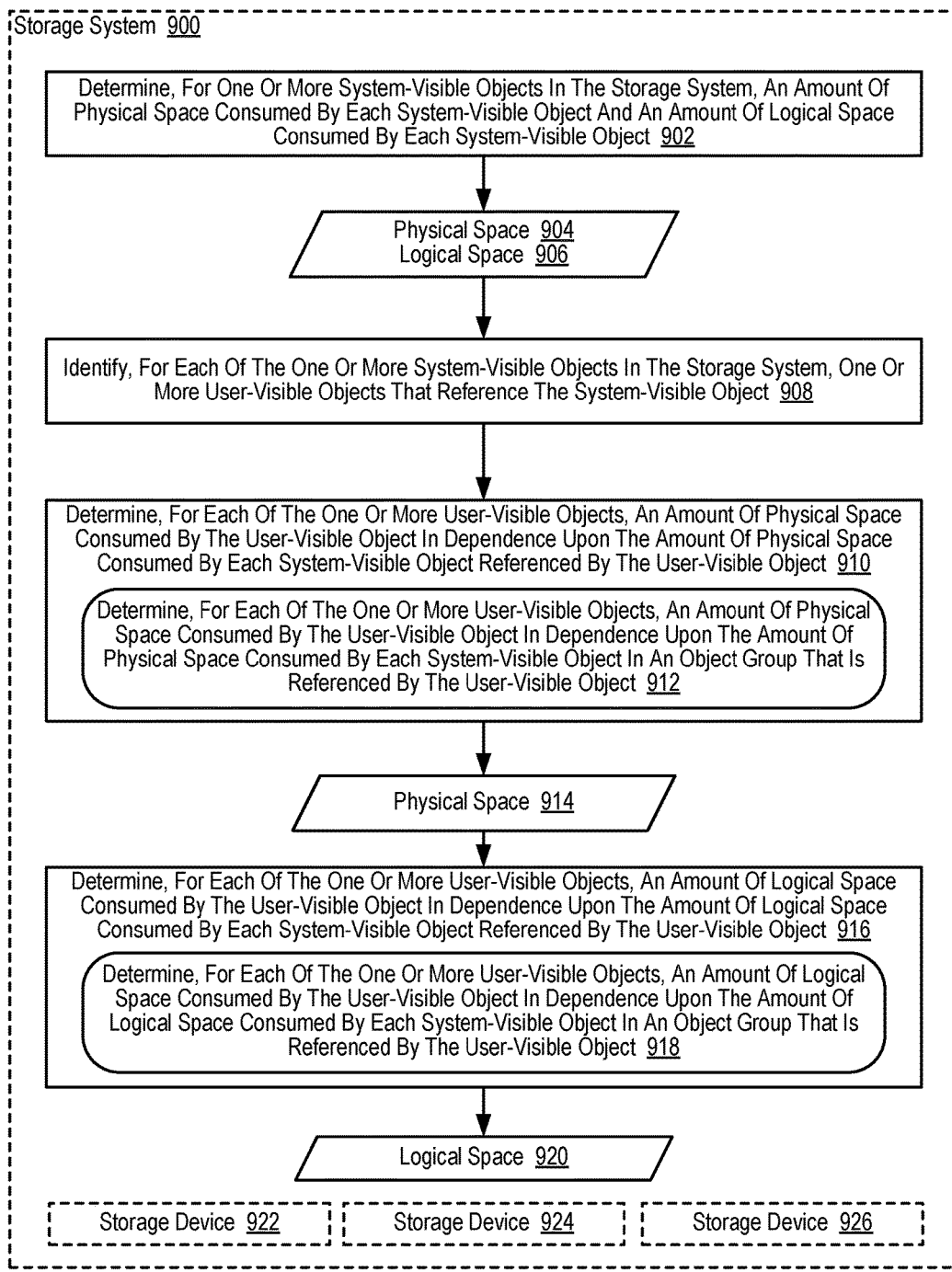
FIG. 9 sets forth a flow chart illustrating an additional example method of space reporting in a storage system according to embodiments of the present disclosure.

For further explanation, FIG. 9 sets forth a flow chart illustrating an additional example method of space reporting in a storage system (900) according to embodiments of the present disclosure. Although depicted in less detail, the storage system (900) depicted in FIG. 9 may be similar to the storage systems described above with reference to FIGS. 1-3. As such, the storage system (900) depicted in FIG. 9 may include a plurality of storage devices (922, 924, 926) such as a plurality of SSDs, as well as other components such as one or more storage array controllers, NVRAM storage devices, data communications apparatus such as a midplane, and so on.

The example method depicted in FIG. 9 includes determining (902), for one or more system-visible objects in the storage system (900), an amount of physical space (904) consumed by each system-visible object and an amount of logical space (906) consumed by each system-visible object. Determining (902) the amount of physical space (904) consumed by each system-visible object and the amount of logical space (906) consumed by each system-visible object may be carried out, for example, by examining information generated by an extent summary module, by a space measurement module, or by one or more other modules in the storage system. In such an example, one or more of the modules in the storage system may be configured to maintain one or more data structures such as one or more tables that include information for each data object that is written to the storage system. The information for each data object that is written to the storage system may be created when the data object is first written to the storage system and may be updated as the data object is removed from the storage system, as the physical size of the data object changes in response to the application of data reduction techniques (e.g., deduplication, compression), and so on.

The example method depicted in FIG. 9 includes identifying (908), for each of the one or more system-visible objects in the storage system (900), one or more user-visible objects that reference the system-visible object. In the example method depicted in FIG. 9, identifying (908) one or more user-visible objects that reference the system-visible object may be carried out, for example, by a space rollup module or other module in the storage system (900). Identifying (908) one or more user-visible objects that reference the system-visible object may be carried out, for example, by traversing a data structure such as the graph representing data stored in the storage system (900) that is depicted in FIG. 4. In such an example, a space rollup module or other module in the storage system (900) may traverse the graph representing data stored in the storage system (900) that is depicted in FIG. 4 by starting at a node in the top of the graph that represents a user-visible object and following, level-by-level, links in lower levels of the graph to identify all system-visible objects that are referenced by the user-visible object.

As an example of identifying (908) one or more user-visible objects that reference a particular system-visible object, the space rollup module or other module in the storage system (900) may traverse the graph representing data stored in the storage system (900) that is depicted in FIG. 4 in an effort to identify (908) one or more user-visible objects that reference a particular extent (438 of FIG. 4). For example, the space rollup module or other module in the storage system (900) may traverse the graph by starting at the first snapshot (404 of FIG. 4). Traversing the graph reveals that the first snapshot (404 of FIG. 4) references a medium (412 of FIG. 4), which references an additional medium (422 of FIG. 4), which references the particular extent (438 of FIG. 4). As such, a user-visible object in the form of the first snapshot (404 of FIG. 4) is identified (908) as referencing the particular extent (438 of FIG. 4). The space rollup module or other module in the storage system (900) may also traverse the graph by starting at the second volume (406 of FIG. 4). Traversing the graph reveals that the second volume (406 of FIG. 4) references a medium (414 of FIG. 4), which references an additional medium (424 of FIG. 4), which references the particular extent (438 of FIG. 4). As such, a user-visible object in the form of the second volume (406 of FIG. 4) is also identified (908) as referencing the particular extent (438 of FIG. 4). Readers will appreciate that by traversing the graph for each of the user-visible objects, all user-visible objects that reference a particular system-visible object may be identified (908).

The example method depicted in FIG. 9 includes determining (910), for each of the one or more user-visible objects, an amount of physical space (914) consumed by the user-visible object in dependence upon the amount of physical space (904) consumed by each system-visible object referenced by the user-visible object. Determining (910) the amount of physical space (914) consumed by a particular user-visible object may be carried out, for example, by summing up the amount of physical space (904) that is consumed by each system-visible object referenced by the particular user-visible object. In embodiments where only the system-visible objects in a particular object group are analyzed, determining (910), for each of the one or more user-visible objects, an amount of physical space (914) consumed by the user-visible object in dependence upon the amount of physical space (904) consumed by each system-visible object referenced by the user-visible object can include determining (912), for each of the one or more user-visible objects, an amount of physical space consumed by the user-visible object in dependence upon the amount of physical space consumed by each system-visible object in the object group that is referenced by the user-visible object.

The example method depicted in FIG. 9 includes determining (916), for each of the one or more user-visible objects, an amount of logical space (920) consumed by the user-visible object in dependence upon the amount of logical space (906) consumed by each system-visible object referenced by the user-visible object. Determining (916) the amount of logical space (920) consumed by the user-visible object may be carried out, for example, by summing up the amount of logical space (906) that is consumed by each system-visible object referenced by the particular user-visible object. In embodiments where only the system-visible objects in a particular object group are analyzed, determining (916), for each of the one or more user-visible objects, an amount of logical space (920) consumed by the user-visible object in dependence upon the amount of logical space (906) consumed by each system-visible object referenced by the user-visible object may include determining (918), for each of the one or more user-visible objects, an amount of logical space consumed by the user-visible object in dependence upon the amount of logical space consumed by each system-visible object in the object group that is referenced by the user-visible object.

Although not expressly illustrated in the example depicted in FIG. 9, the example method depicted in FIG. 9 may be modified through the inclusion of steps described in greater detail in the preceding Figures. For example, the example method depicted in FIG. 9 may include all combinations of one or more of the following steps described in greater detail in the preceding Figures: determining whether the amount of physical space consumed by a particular system-visible object is less than a previously determined amount of physical space consumed by the particular system-visible object as described above with reference to FIG. 6; responsive to determining that the amount of physical space consumed by the particular system-visible object is less than the previously determined amount of physical space consumed by the particular system-visible object, reporting the particular system-visible object to a garbage collection process as described above with reference to FIG. 6; reporting, to the garbage collection process, the difference between the amount of physical space consumed by the particular system-visible object and the previously determined amount of physical space consumed by the particular system-visible object as described above with reference to FIG. 6; determining a resource utilization budget for space reporting as described above with reference to FIG. 7; determining, in dependence upon the resource utilization budget for space reporting, a number of system-visible objects that can be analyzed in parallel as described above with reference to FIG. 7; creating an object group that includes the number of system-visible objects that can be analyzed in parallel as described above with reference to FIG. 7; determining the amount of physical space and logical space consumed by each system-visible object in the object group as described above with reference to FIG. 7; identifying, for each system-visible object in the object group, one or more user-visible objects that reference the system-visible object as described above with reference to FIG. 7; determining, in dependence upon the amount of physical space consumed by the user-visible object and the amount of logical space consumed by the user-visible object, an amount of data reduction associated with the user-visible object as described above with reference to FIG. 8; determining, in dependence upon the amount of physical space consumed by a group of user-visible objects in the storage system and the amount of logical space consumed by the group of user-visible objects in the storage system, an amount of data reduction associated with the group of user-visible objects as described above with reference to FIG. 8; and reporting the amount of physical space consumed by one or more user-visible objects and the amount of logical space consumed by one or more user-visible objects as described above with reference to FIG. 8.

Figure 10:
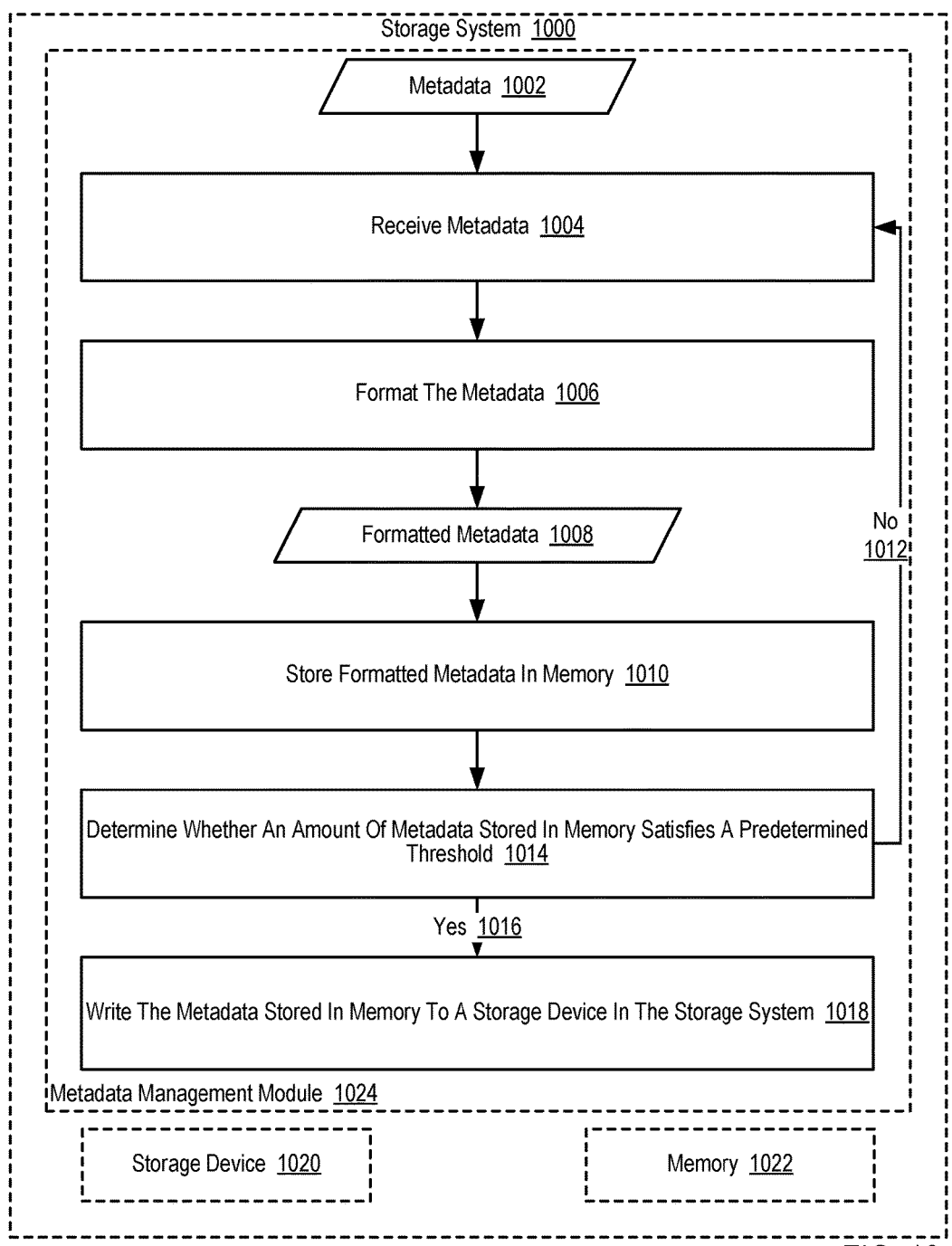
FIG. 10 sets forth a flowchart illustrating an example method carried out by a storage array that is configured for reporting space utilization according to embodiments of the present disclosure.

For further explanation, FIG. 10 sets forth a flowchart illustrating an example method carried out by a storage system that is configured for reporting space utilization according to embodiments of the present disclosure. The example method depicted in FIG. 10 may be carried out, for example, by one or more modules of computer program instructions executing on computer hardware such as a computer processor. In the example method depicted in FIG. 10, the one or more modules of computer program instructions executing on computer hardware such as a computer processor are depicted as a metadata management module (1024). The metadata management module (1024) may be executed, for example, on computer hardware that is contained in a storage system controller such as the storage system controllers described above with reference to FIGS. 1-3, although such computer hardware may alternatively reside within another type of computing device such as a system management server or other computing device.

The example method depicted in FIG. 10 includes receiving (1004) metadata (1002) that is associated with data stored on the storage system (1000). Such metadata (1002) may be used to describe data stored on the storage system (1000) as the metadata (1002) can include information such as, for example, the size of the corresponding data that is stored on the storage system (1000), an identification of a user that caused the corresponding data to be stored on the storage system (1000), and so on. Readers will appreciate that the storage system (1000) depicted in FIG. 10 may therefore store at least two types of content: 1) data, and 2) metadata that describes or is otherwise related to the data. In the example method depicted in FIG. 10, receiving (1004) metadata (1002) may be carried out, for example, by system software executing on a storage system controller generating the metadata (1002) in response to a request to write data to the storage system, by a storage system controller receiving the metadata (1002) as part of a request to write data to the storage system, by a storage system controller receiving the metadata (1002) from a garbage collection process, by a storage system controller receiving the metadata (1002) from a data reduction process, and so on.

In one embodiment of the example method depicted in FIG. 10, the metadata (1002) that is received (1004) may be metadata generated by one or more of the components described above with reference to FIG. 7. For example, metadata (1002) may be received (1004) from a flush/triage component. Such a flush/triage component may be configured to determine the size of a data object, both logically and physically, when the data object is written to the storage system (1000). The flush/triage component may be configured to provide metadata that includes information such as, for example, the physical size of a data object stored in the storage system (1000), the logical size of a data object stored in the storage system (1000), an identification of the data object stored in the storage system (1000), and so on. In such an example, the flush/triage component may be configured to send such metadata to the metadata management module (1024). Readers will appreciate that metadata generated by other components such as the space measurement component, extent summary component, space rollup component, or other components may also be received (1004) by the metadata management module (1024).

In the example method depicted in FIG. 10, the metadata (1002) that is received by the metadata management module (1024) may include a collection of keys and values, such as a collection of keys and values that could represent a single row in a table or database. The metadata (1002) may be formatted according to a predetermined schema that defines the set of key columns and value columns in such a table or database. For example, a schema that maps logical addresses associated with some data to the physical block addresses in the storage system where such data is stored may include a key that specifies a range of logical sectors covered by the mapping.

The example method depicted in FIG. 10 also includes formatting (1006) the metadata (1002). Formatting (1006) the metadata (1002) may be carried out, for example, by system software executing on a storage system controller encoding the metadata (1002) into a different representation through the use of an encoding scheme. Formatting (1006) the metadata (1002) may also be carried out, for example, by system software executing on a storage system controller performing data reduction techniques such as data compression, data deduplication, or other techniques on the metadata (1002) so as to reduce the size of the metadata (1002). Formatting (1006) the metadata (1002) may also be carried out by system software executing on a storage system controller performing any other operations that can alter the metadata (1002) itself. Although the examples described above relate to embodiments where system software executing on a storage system controller formats (1006) the metadata (1002), readers will appreciate that in alternative embodiments, storage system (1000) components other than a storage system controller may be responsible for formatting (1006) the metadata (1002). Readers will appreciate that in some embodiments, formatting (1006) the metadata (1002) may not be necessary as the metadata (1002) that was received (1004) may already be sufficiently formatted.

The example method depicted in FIG. 10 also includes storing (1010) the formatted metadata (1008) in memory (1022) that is included within the storage system (1000). The memory (1022) that is included within the storage system (1000) may be embodied, for example, as RAM that is contained within a storage system controller. Readers will appreciate that the memory (1022) that is included within the storage system (1000) is distinct from the storage devices (1020) in the storage system (1000) that are used for long-term, persistent storage of data and metadata in the storage system. As such, the memory (1022) that is included within the storage system (1000) may be embodied as volatile memory that may be accessed more quickly than the non-volatile storage devices (1020) in the storage system (1000) that are used for long-term, persistent storage of data and metadata in the storage system. As such, the memory (1022) that is included within the storage system (1000) may not represent the location within the storage system (1000) where the formatted metadata (1008) will be persistently stored.

The example method depicted in FIG. 10 also includes determining (1014) whether an amount of metadata stored in memory (1022) satisfies a predetermined threshold. The amount of metadata stored in memory (1022) may represent the size of not only the formatted metadata (1008) that was stored (1010) in the memory (1022) in the previously described step, but also the cumulative size of the formatted metadata (1008) that was stored (1010) in the memory (1022) in the previously described step as well as any other formatted metadata that has been previously committed to memory (1022) but not yet stored on one of the storage devices (1020) in the storage system (1000). As such, the memory (1022) may serve as buffer for storing formatted metadata prior to writing the formatted metadata to one or more of the storage devices (1020) in the storage system (1000).

In the example method depicted in FIG. 10, the predetermined threshold may be embodied as a value that is set by a system administrator or other entity. The predetermined threshold may be expressed in terms of KB, MB, or any other appropriate unit of measure. In such an example, the predetermined threshold may be set to a value that corresponds to the size of other logical or physical entities within the storage system (1000) such as the size of a memory block on a storage device (1020), the size of a segment in the storage system (1000), and so on. In such a way, rather than writing formatted metadata (1008) to the storage system (1000) every time after metadata is received and formatted, formatted metadata may be pooled together and written in such a way that makes better utilization of the storage devices (1020) and minimizes the amount of I/O operations required to persistently store the formatted metadata.

In the example method depicted in FIG. 10, if it is determined that the amount of metadata stored in memory (1022) does not (1012) satisfy the predetermined threshold, the storage system (1000) may perform other operations until additional metadata is received. If it is affirmatively (1016) determined that the amount of metadata stored in memory (1022) does (1016) satisfy the predetermined threshold, however, the storage system (1000) may proceed by writing (1018) the metadata stored in memory (1022) to one or more storage devices (1020) in the storage system (1000). In the example method depicted in FIG. 10, writing (1018) the metadata stored in memory (1022) to one or more storage devices (1020) in the storage system (1000) may carried out through the use of an interface that is accessible by the metadata management module (1024). Such an interface may be utilized to write formatted metadata to one or more storage devices (1020) in the storage system (1000) such that metadata is separated from data, as a particular unit (e.g., a memory block in an SSD) within the storage system (1000) can include only data, only metadata or both data and metadata.

Readers will appreciate that the example method depicted in FIG. 10 represents only one of many possible methods that may be carried out by a storage system that is configured for reporting space utilization according to embodiments of the present disclosure. In other embodiments, the metadata management module (1024) may perform additional or fewer steps. For example, in some embodiments the metadata (1002) that is received (1004) may already be in the appropriate format and, as such, the step of formatting (1006) the metadata (1002) may not need to be performed.

Readers will appreciate that in some embodiments described above, each system-visible object in the storage system is non-overlapping. Each system-visible object in the storage system is non-overlapping in the sense that data physically stored on the storage is not included in multiple system-visible objects. Data physically stored on the storage may be included in a first system-visible object and may also be referenced by a second system-visible object, but the second system-visible object will only include the reference to the data and not the data itself. Readers will further appreciate that in some embodiments described above, each user-visible object in the system that references a particular system-visible object must reference the entire system-visible object. In such embodiments, a user-visible object in the system that references a particular system-visible object therefore cannot reference a sub-portion of the system-visible object.

Readers will appreciate that although the example methods described above are depicted in a way where a series of steps occurs in a particular order, no particular ordering of the steps is required unless explicitly stated. Example embodiments of the present invention are described largely in the context of a fully functional computer system for space reporting in a storage system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of space reporting in a storage system, the method comprising:
   determining, by a storage array controller, an amount of physical space and an amount of logical space consumed by each system-visible object referenced by a user-visible object;
   determining, in dependence upon the amount of physical space and the amount of logical space consumed by each system-visible object referenced by the user-visible object, by the storage array controller, an amount of physical space and an amount of logical space consumed by the user-visible object;
   determining whether the amount of physical space consumed by a particular system-visible object is less than a previously determined amount of physical space consumed by the particular system-visible object; and
   responsive to determining that the amount of physical space consumed by the particular system-visible object is less than the previously determined amount of physical space consumed by the particular system-visible object, reporting the particular system-visible object to a garbage collection process.

2. The method of claim 1 wherein reporting the particular system-visible object to a garbage collection process further comprises reporting, to the garbage collection process, the difference between the amount of physical space consumed by the particular system-visible object and the previously determined amount of physical space consumed by the particular system-visible object.

3. The method of claim 1 further comprising:
   determining a resource utilization budget for space reporting;
   determining, in dependence upon the resource utilization budget for space reporting, a number of system-visible objects that can be analyzed in parallel; and
   creating an object group that includes the number of system-visible objects that can be analyzed in parallel.

4. The method of claim 3 wherein:
   determining an amount of physical space and an amount of logical space consumed by each system-visible object referenced by a user-visible object further comprises determining the amount of physical space and logical space consumed by each system-visible object in the object group;
   further comprising identifying one or more system-visible objects in the object group that are referenced by the user-visible object;
   wherein determining, in dependence upon the amount of physical space and the amount of logical space consumed by each system-visible object referenced by the user-visible object, an amount of physical space and an amount of logical space consumed by the user-visible object further comprises determining, in dependence upon an amount of physical space consumed by each system-visible object in the object group that is referenced by the user-visible object and an amount of logical space consumed by each system-visible object in the object group that is referenced by the user-visible object, the amount of physical space consumed by the user-visible object and the amount of logical space consumed by the user-visible object.

5. The method of claim 1 further comprising determining, in dependence upon the amount of physical space consumed by the user-visible object and the amount of logical space consumed by the user-visible object, an amount of data reduction associated with the user-visible object.

6. The method of claim 1 further comprising determining, in dependence upon the amount of physical space consumed by a group of user-visible objects in the storage system and the amount of logical space consumed by the group of user-visible objects in the storage system, an amount of data reduction associated with the group of user-visible objects.

7. The method of claim 1 wherein each system-visible object in the storage system is non-overlapping and wherein each user-visible object that references the system-visible object references the entire system-visible object.

8. The method of claim 1 further comprising reporting the amount of physical space consumed by one or more user-visible objects and the amount of logical space consumed by one or more user-visible objects.

9. An apparatus for space reporting in a storage system, the apparatus including a computer processor and a computer memory, the computer memory including computer program instructions that, when executed by the computer processor, cause the apparatus to carry out the steps of:
   determining, by a storage array controller, an amount of physical space and an amount of logical space consumed by each system-visible object referenced by a user-visible object;
   determining, in dependence upon the amount of physical space and the amount of logical space consumed by each system-visible object referenced by the user-visible object, by the storage array controller, an amount of physical space and an amount of logical space consumed by the user-visible object;
   determining whether the amount of physical space consumed by a particular system-visible object is less than a previously determined amount of physical space consumed by the particular system-visible object; and
   responsive to determining that the amount of physical space consumed by the particular system-visible object is less than the previously determined amount of physical space consumed by the particular system-visible object, reporting the particular system-visible object to a garbage collection process.

10. The apparatus of claim 9 further comprising computer program instructions that, when executed by the computer processor, cause the apparatus to carry out the steps of:
    determining whether the amount of physical space consumed by a particular system-visible object is less than a previously determined amount of physical space consumed by the particular system-visible object; and
    responsive to determining that the amount of physical space consumed by the particular system-visible object is less than the previously determined amount of physical space consumed by the particular system-visible object, reporting the particular system-visible object to a garbage collection process.

11. The apparatus of claim 10 wherein reporting the particular system-visible object to a garbage collection process further comprises reporting, to the garbage collection process, the difference between the amount of physical space consumed by the particular system-visible object and the previously determined amount of physical space consumed by the particular system-visible object.

12. The apparatus of claim 9 further comprising computer program instructions that, when executed by the computer processor, cause the apparatus to carry out the steps of:
   determining a resource utilization budget for space reporting;
   determining, in dependence upon the resource utilization budget for space reporting, a number of system-visible objects that can be analyzed in parallel; and
   creating an object group that includes the number of system-visible objects that can be analyzed in parallel.

13. The apparatus of claim 12 further comprising:
   identifying one or more system-visible objects in the object group that are referenced by the user-visible object; and
   determining, in dependence upon the amount of physical space and the amount of logical space consumed by each system-visible object referenced by the user-visible object, an amount of physical space and an amount of logical space consumed by the user-visible object further comprises determining, in dependence upon an amount of physical space consumed by each system-visible object in the object group that is referenced by the user-visible object and an amount of logical space consumed by each system-visible object in the object group that is referenced by the user-visible object, the amount of physical space consumed by the user-visible object and the amount of logical space consumed by the user-visible object.

14. The apparatus of claim 9 further comprising computer program instructions that, when executed by the computer processor, cause the apparatus to carry out the step of determining, in dependence upon the amount of physical space consumed by the user-visible object and the amount of logical space consumed by the user-visible object, an amount of data reduction associated with the user-visible object.

15. The apparatus of claim 9 further comprising computer program instructions that, when executed by the computer processor, cause the apparatus to carry out the step of determining, in dependence upon the amount of physical space consumed by a group of user-visible objects in the storage system and the amount of logical space consumed by the group of user-visible objects in the storage system, an amount of data reduction associated with the group of user-visible objects.

16. The apparatus of claim 9 wherein each system-visible object in the storage system is non-overlapping and wherein each user-visible object that references the system-visible object references the entire system-visible object.

17. The apparatus of claim 9 further comprising computer program instructions that, when executed by the computer processor, cause the apparatus to carry out the step of reporting the amount of physical space consumed by one or more user-visible objects and the amount of logical space consumed by one or more user-visible objects.

* * * * *